US012767823B2

(12) United States Patent
Nakai

(10) Patent No.: US 12,767,823 B2
(45) Date of Patent: Oct. 20, 2026

(54) COMPOSITION FOR ACOUSTIC LENS, ACOUSTIC LENS, ACOUSTIC WAVE PROBE, ULTRASOUND PROBE, ACOUSTIC WAVE MEASUREMENT APPARATUS, ULTRASOUND DIAGNOSTIC APPARATUS, PHOTOACOUSTIC WAVE MEASUREMENT APPARATUS, ULTRASONIC ENDOSCOPE, AND METHOD FOR MANUFACTURING ACOUSTIC WAVE PROBE

(71) Applicant: FUJIFILM Corporation, Tokyo (JP)

(72) Inventor: Yoshihiro Nakai, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

(21) Appl. No.: 18/739,733

(22) Filed: Jun. 11, 2024

(65) Prior Publication Data

US 2024/0327640 A1 Oct. 3, 2024

Related U.S. Application Data

(63) Continuation of application No. PCT/JP2023/001794, filed on Jan. 20, 2023.

(30) Foreign Application Priority Data

Jan. 28, 2022 (JP) ................................. 2022-011679

(51) Int. Cl.
*C08L 83/04* (2006.01)
*C08K 5/56* (2006.01)
(Continued)

(52) U.S. Cl.
CPC ................ *C08L 83/04* (2013.01); *C08K 5/56* (2013.01); *C08K 9/06* (2013.01); *G10K 11/30* (2013.01);
(Continued)

(58) Field of Classification Search
CPC ............... C08L 83/04; C08L 2205/025; C08L 2205/03; C08K 5/56; C08K 9/06; G10K 11/30
See application file for complete search history.

(56) References Cited

U.S. PATENT DOCUMENTS 11,524,099 B2 * 12/2022 Nakai .................... G10K 11/02
2016/0051228 A1 2/2016 Nakai et al.
(Continued)

FOREIGN PATENT DOCUMENTS

EP 3 684 078 A1 7/2020
JP 2012-034160 A 2/2012
(Continued)

OTHER PUBLICATIONS

International Preliminary Report on Patentability dated Jul. 30, 2024 with a Translation of the Written Opinion of the International Searching Authority in Application No. PCT/JP2023/001794.
(Continued)

*Primary Examiner* — Jeremy A Luks
(74) *Attorney, Agent, or Firm* — Sughrue Mion, PLLC

(57) ABSTRACT

Provided are a composition for an acoustic lens, containing the following components (a) to (c), (a) a linear polysiloxane having a vinyl group, (b) a linear polysiloxane having two or more Si—H groups in a molecular chain, and (c) surface-treated silica particles, in which, in a particle diameter distribution of the component (c) obtained by a scanning transmission electron microscope, one or more maximal peaks are detected in a range of 16 nm or more and less than 100 nm, and one or more maximal peaks are detected in a range of 8 nm or more and less than 16 nm; an acoustic lens obtained by curing the composition; an acoustic wave probe, an ultrasound probe, an acoustic wave measurement apparatus, an ultrasound diagnostic apparatus, a photoacoustic wave measurement apparatus, and an ultrasonic endoscope
(Continued)

including the acoustic lens; and a method for manufacturing an acoustic wave probe using the composition.

29 Claims, 1 Drawing Sheet

(51) Int. Cl.
*C08K 9/06* (2006.01)
*G10K 11/30* (2006.01)

(52) U.S. Cl.
CPC ..... *C08L 2205/025* (2013.01); *C08L 2205/03* (2013.01)

(56) References Cited

U.S. PATENT DOCUMENTS

| | | | | |
|---|---|---|---|---|
| 2017/0252465 | A1* | 9/2017 | Nagai | A61B 8/13 |
| 2017/0335108 | A1* | 11/2017 | Morita | B29B 7/002 |
| 2018/0344287 | A1 | 12/2018 | Nakai et al. | |
| 2020/0054305 | A1 | 2/2020 | Niino et al. | |
| 2020/0206393 | A1 | 7/2020 | Nakai et al. | |

FOREIGN PATENT DOCUMENTS

| | | | |
|---|---|---|---|
| JP | 2016-46811 | A | 4/2016 |
| WO | 2017/130890 | A1 | 8/2017 |
| WO | 2018/211812 | A1 | 11/2018 |
| WO | 2019/049984 | A1 | 3/2019 |

OTHER PUBLICATIONS

Written Opinion of the International Searching Authority Dated Mar. 14, 2023 in International Application No. PCT/JP2023/001794.

International Search Report dated Mar. 14, 2023 in Application No. PCT/JP2023/001794.

* cited by examiner

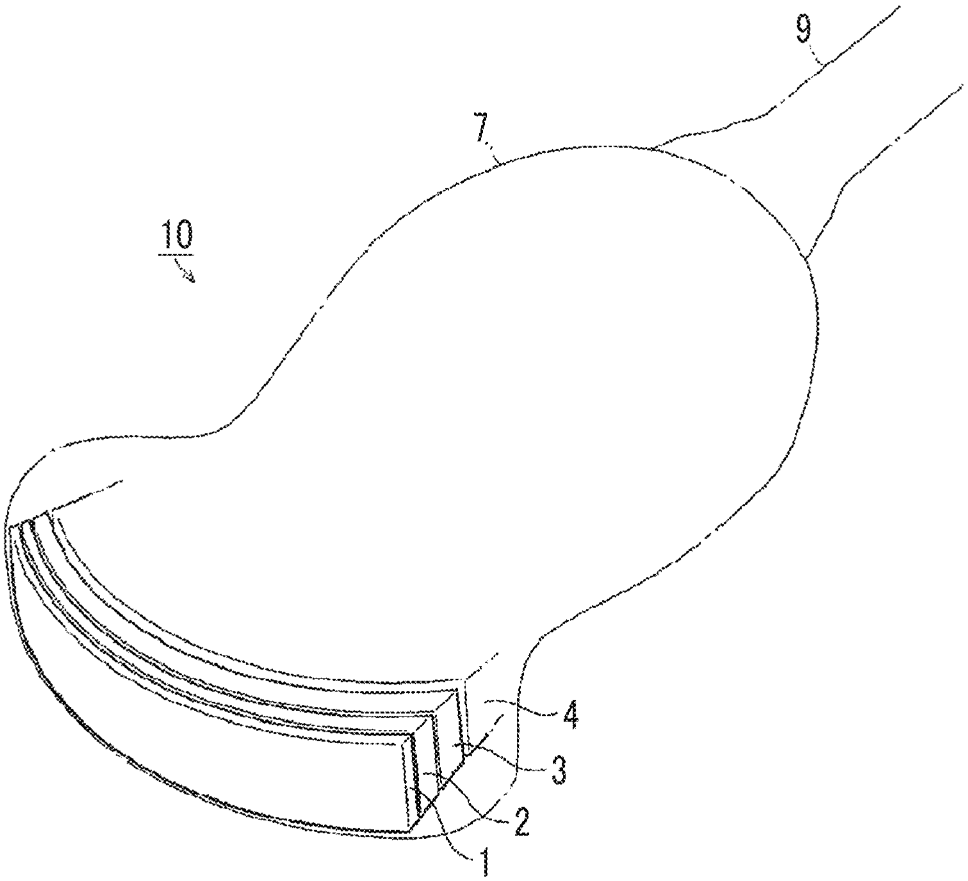
9
7
10
4
3
2
1

COMPOSITION FOR ACOUSTIC LENS, ACOUSTIC LENS, ACOUSTIC WAVE PROBE, ULTRASOUND PROBE, ACOUSTIC WAVE MEASUREMENT APPARATUS, ULTRASOUND DIAGNOSTIC APPARATUS, PHOTOACOUSTIC WAVE MEASUREMENT APPARATUS, ULTRASONIC ENDOSCOPE, AND METHOD FOR MANUFACTURING ACOUSTIC WAVE PROBE

CROSS-REFERENCE TO RELATED APPLICATIONS

This application is a Continuation of PCT International Application No. PCT/JP2023/001794 filed on Jan. 20, 2023, which claims priority under 35 U.S.C. § 119 (a) to Japanese Patent Application No. 2022-011679 filed in Japan on Jan. 28, 2022. Each of the above applications is hereby expressly incorporated by reference, in its entirety, into the present application.

BACKGROUND OF THE INVENTION

1. Field of the Invention

The present invention relates to a composition for an acoustic lens, an acoustic lens, an acoustic wave probe, an ultrasound probe, an acoustic wave measurement apparatus, an ultrasound diagnostic apparatus, a photoacoustic wave measurement apparatus, an ultrasonic endoscope, and a method for manufacturing an acoustic wave probe.

2. Description of the Related Art

In an acoustic wave measurement apparatus, an acoustic wave probe is used which irradiates a test object or site (hereinafter, simply referred to as an object) with an acoustic wave, receives a reflected wave (echo) therefrom, and outputs a signal. The electric signal which is converted from the reflected wave received by this acoustic wave probe is displayed as an image. As a result, an inside of the test object is visualized and observed.

As the acoustic wave, an ultrasonic wave, a photoacoustic wave, or the like having an appropriate frequency is selected according to the test object or the measurement conditions or the like.

For example, an ultrasound diagnostic apparatus transmits an ultrasonic wave to the inside of the test object, receives the ultrasonic wave reflected by tissues inside the test object, and displays the received ultrasonic wave as an image. A photoacoustic wave measurement apparatus receives an acoustic wave radiated from the inside of the test object due to a photoacoustic effect, and displays the received acoustic wave as an image. The photoacoustic effect is a phenomenon in which an acoustic wave (typically, an ultrasonic wave) is generated through thermal expansion after a test object absorbs an electromagnetic wave to generate heat in a case where the test object is irradiated with an electromagnetic wave pulse of visible light, near infrared light, microwave, or the like.

Since the acoustic wave measurement apparatus transmits and receives an acoustic wave to and from a living body which is the test object, for example, the acoustic wave measurement apparatus is required to have matching of acoustic impedance with a living body (typically a human body), and is required to suppress the amount of acoustic wave attenuation.

For example, an ultrasound diagnostic apparatus probe (also referred to as an ultrasound probe) which is one type of an acoustic wave probe includes a piezoelectric element which transmits and receives ultrasound waves, and an acoustic lens which is a portion in contact with a living body. An ultrasonic wave oscillated from the piezoelectric element is incident on the living body after being transmitted through the acoustic lens. In a case where a difference between an acoustic impedance (density×acoustic velocity) of the acoustic lens and an acoustic impedance of the living body is large, the ultrasound wave is reflected on a surface of the living body so that the ultrasound wave is not efficiently incident into the living body. As a result, it is difficult to obtain a favorable resolution. In addition, in order to transmit and receive the ultrasound waves with high sensitivity, it is desired to reduce the amount of ultrasound wave attenuation of the acoustic lens.

Therefore, as one of materials of the acoustic lens, a silicone resin having an acoustic impedance close to the acoustic impedance of the living body (in a case of the human body, 1.4 to $1.7\times10^6$ $kg/m^2/sec$) and a small amount of ultrasound wave attenuation is used.

In addition, in the use of the acoustic wave measurement apparatus, the acoustic wave probe is rubbed against the living body to transmit and receive the acoustic waves. Therefore, the acoustic lens is required to have high mechanical strength as a portion which is rubbed against the living body and sometimes pressed against the living body. Since the silicone resin is generally soft and has deteriorated mechanical strength, it is required to improve the mechanical strength by mixing a mineral filler with the silicone resin or introducing a crosslinking structure.

For example, WO2017/130890A discloses a composition for an acoustic wave probe, the composition containing a polysiloxane mixture which contains a polysiloxane having a vinyl group, a polysiloxane having two or more Si—H groups in a molecular chain, and surface-treated silica particles having an average primary particle diameter of more than 16 nm and less than 100 nm. In addition, WO2019/049984A discloses a composition for an acoustic wave probe, the composition containing a linear polysiloxane having a vinyl group, a linear polysiloxane having two or more Si—H groups in a molecular chain, a polysiloxane resin, and surface-treated silica particles having an average primary particle diameter of more than 16 nm and less than 100 nm. According to the techniques disclosed in WO2017/130890A and WO2019/049984A, it can be said that, by using the above-described composition for an acoustic wave probe, a silicone resin for an acoustic wave probe to be obtained has excellent tear strength.

SUMMARY OF THE INVENTION

From the viewpoint of repeated use of the acoustic wave probe over a long period of time, the present inventor has further studied mechanical properties of the acoustic lens. As a result, it has been found that, over the years, in a case where the acoustic wave probe is pressed against the living body, rubbed against the living body, or disinfected with a chemical at each time of use, fine cracks begin to occur in the acoustic lens, and the cracks cause a defocus of an acoustic wave image.

An object of the present invention is to provide an acoustic lens which has excellent tear strength, is unlikely to cause cracks even in a case of repeated bending, and has excellent chemical resistance; a curable composition (composition for an acoustic lens) suitable for forming the acoustic lens; an acoustic wave probe, an ultrasound probe, an acoustic wave measurement apparatus, an ultrasound diagnostic apparatus, a photoacoustic wave measurement apparatus, and an ultrasonic endoscope including the acoustic lens; and a method for manufacturing the acoustic wave probe.

As a result of intensive studies in view of the above-described objects, the present inventor has found that, by preparing a curable composition which contains a linear polysiloxane having a vinyl group and a linear polysiloxane having two or more Si—H groups in a molecular chain as raw materials of a silicone resin, and further contains surface-treated silica particles having one or more maximal values in each of a specific range of small particle diameters and a specific range of large particle diameters in a particle diameter distribution, and curing the composition by carrying out a curing reaction, a cured reaction product to be obtained has excellent tearing strength, is unlikely to cause cracks even in a case of repeated bending, and has excellent chemical resistance. The present invention has been completed through further studies based on these findings.

The above-described objects have been achieved by the following methods.

<1>

A composition for an acoustic lens, comprising the following components (a) to (c):

(a) a linear polysiloxane having a vinyl group;

(b) a linear polysiloxane having two or more Si—H groups in a molecular chain; and (c) surface-treated silica particles, in which, in a particle diameter distribution of the component (c) obtained by a scanning transmission electron microscope, one or more maximal peaks are detected in a range in which a peak top is 16 nm or more and less than 100 nm, and one or more maximal peaks are detected in a range in which a peak top is 8 nm or more and less than 16 nm.

<2>

The composition for an acoustic lens according to <1>, in which a shape of the component (c) is a true sphere shape.

<3>

The composition for an acoustic lens according to <1> or <2>, in which a content of the component (c) is 25 to 70 parts by mass in 100 parts by mass of a total content of the components (a) to (c).

<4>

The composition for an acoustic lens according to any one of <1> to <3>, in which a content of the component (a) is 25 to 70 parts by mass and a content of the component (b) is 0.3 to 3 parts by mass, in 100 parts by mass of a total content of the components (a) to (c).

<5>

The composition for an acoustic lens according to <1> or <2>, further comprising:

(d) a polysiloxane resin.

<6>

The composition for an acoustic lens according to <5>, in which a content of the component (d) is 5 to 20 parts by mass in 100 parts by mass of a total content of the components (a) to (d).

<7>

The composition for an acoustic lens according to <5> or <6>, in which a content of the component (c) is 25 to 70 parts by mass in 100 parts by mass of a total content of the components (a) to (d).

<8>

The composition for an acoustic lens according to any one of <5> to <7>, in which a content of the component (a) is 20 to 65 parts by mass and a content of the component (b) is 0.3 to 3 parts by mass, in 100 parts by mass of a total content of the components (a) to (d).

<9>

The composition for an acoustic lens according to any one of <1> to <8>, in which the surface treatment of the component (c) is a surface treatment with a silane compound.

<10>

The composition for an acoustic lens according to any one of <1> to <9>, in which the surface treatment of the component (c) is a surface treatment with an aromatic silane compound.

<11>

The composition for an acoustic lens according to any one of <1> to <10>, in which a methanol hydrophobicity degree of the component (c) is 40% to 80% by mass.

<12>

The composition for an acoustic lens according to any one of <1> to <11>, in which the component (a) has a phenyl group.

<13>

The composition for an acoustic lens according to any one of <1> to <12>, in which a weight-average molecular weight of the component (a) is 20,000 to 200,000.

<14>

The composition for an acoustic lens according to any one of <1> to <13>, in which a weight-average molecular weight of the component (a) is 40,000 to 150,000.

<15>

The composition for an acoustic lens according to any one of <5> to <8>, in which the component (d) is a polysiloxane resin which includes an $R_3SiO_{1/2}$ unit and an $SiO_{4/2}$ unit and has at least two vinyl groups in one molecule, and a molar ratio of the $R_3SiO_{1/2}$ unit to the $SiO_{422}$ unit is 0.6 to 1.2, provided that R represents a monovalent hydrocarbon group.

<16>

The composition for an acoustic lens according to <15>, in which the component (d) consists of the $R_3SiO_{1/2}$ unit and the $SiO_{4/2}$ unit.

<17>

The composition for an acoustic lens according to any one of <1> to <4>, further comprising:

at least one of platinum or a platinum compound in an amount of 0.00001 to 0.01 parts by mass with respect to 100 parts by mass of a total content of the components (a) to (c).

<18>

The composition for an acoustic lens according to any one of <5> to <8>, further comprising:

at least one of platinum or a platinum compound in an amount of 0.00001 to 0.01 parts by mass with respect to 100 parts by mass of a total content of the components (a) to (d).

<19>

An acoustic lens obtained by curing the composition for an acoustic lens according to any one of <1> to <18>.

<20>

An acoustic wave probe comprising:

the acoustic lens according to <19>.

<21>

An ultrasound probe comprising:

the acoustic lens according to <19>.

<22>

An acoustic wave measurement apparatus comprising:

the acoustic wave probe according to <20>.

<23>

An ultrasound diagnostic apparatus comprising:

the acoustic wave probe according to <20>.

<24>

A photoacoustic wave measurement apparatus comprising:

the acoustic lens according to <19>.

<25>

An ultrasonic endoscope comprising:

the acoustic lens according to <19>.

<26>

A method for manufacturing an acoustic wave probe, comprising:

forming an acoustic lens using the composition for an acoustic lens according to any one of <1> to <18>.

In the present specification, unless otherwise specified, in a case where a plurality of groups having the same reference numerals are present in the general formula representing a compound, the groups may be the same or different from each other, and the group specified by each group (for example, an alkyl group) may further have a substituent. In addition, the "Si—H group" means a group having three bonding sites on the silicon atom, and the description of these bonding sites is omitted to simplify the notation.

In addition, the expression "to" in the present specification is used to mean that numerical values described before and after "to" are included as a lower limit value and an upper limit value, respectively.

The acoustic lens according to the aspect of the present invention has excellent tear strength, is unlikely to cause cracks even in a case of repeated bending, and has excellent chemical resistance. The composition for an acoustic lens according to the aspect of the present invention is a curable composition suitable for forming the acoustic lens.

In addition, the acoustic wave probe, the ultrasound probe, the acoustic wave measurement apparatus, the ultrasound diagnostic apparatus, the photoacoustic wave measurement apparatus, and the ultrasonic endoscope according to the aspects of the present invention include the acoustic lens with the above-described excellent performance.

In addition, according to the method for manufacturing an acoustic wave probe according to the embodiment of the present invention, the above-described acoustic wave probe can be obtained.

BRIEF DESCRIPTION OF THE DRAWINGS

The FIGURE is a perspective view of an example of a convex type ultrasound probe which is an aspect of an acoustic wave probe.

DESCRIPTION OF THE PREFERRED EMBODIMENTS

<<Composition for Acoustic Lens>>

The composition for an acoustic lens (hereinafter, also simply referred to as a composition) according to the embodiment of the present invention contains the following components (a) to (c).

(a) a linear polysiloxane having a vinyl group (component (a)), (b) a linear polysiloxane having two or more Si—H groups in a molecular chain (component (b)), and (c) surface-treated silica particles (component (c))

With regard to the component (c) contained in the composition according to the embodiment of the present invention, in a particle diameter distribution obtained by a scanning transmission electron microscope (hereinafter, simply referred to as a particle diameter distribution of the component (c)), one or more maximal peaks are detected in a range in which a peak top is 16 nm or more and less than 100 nm, and one or more maximal peaks are detected in a range in which a peak top is 8 nm or more and less than 16 nm.

From the viewpoint of improving tearing strength, bending durability, and chemical resistance of the acoustic lens, the composition according to the embodiment of the present invention preferably contains a polysiloxane resin (component (d)).

From the viewpoint of improving the tearing strength, bending durability, and chemical resistance of the acoustic lens, in a case of not containing the component (d), a content of the component (c) is preferably 25 to 70 parts by mass, more preferably 30 to 65 parts by mass, still more preferably 35 to 65 parts by mass, even more preferably 40 to 60 parts by mass, and even still more preferably 45 to 55 parts by mass in 100 parts by mass of the total content of the components (a) to (c).

In addition, in 100 parts by mass of the total content of the components (a) to (c), respective contents of the components (a) and (b) are preferably in the following ranges.

From the viewpoint of improving the tearing strength, bending durability, and chemical resistance of the acoustic lens, the content of the component (a) is preferably 25 to 70 parts by mass, more preferably 30 to 65 parts by mass, still more preferably 35 to 60 parts by mass, even more preferably 37 to 55 parts by mass, and even still more preferably 37 to 53 parts by mass. The content of the component (b) is preferably 0.3 to 3 parts by mass and more preferably 0.3 to 2 parts by mass.

From the viewpoint of improving the tearing strength, bending durability, and chemical resistance of the acoustic lens, in a case of containing the component (d), a content of the component (c) is preferably 25 to 70 parts by mass, more preferably 30 to 65 parts by mass, still more preferably 35 to 65 parts by mass, even more preferably 37 to 60 parts by mass, even still more preferably 40 to 55 parts by mass, and further more preferably 45 to 55 parts by mass in 100 parts by mass of the total content of the components (a) to (d).

In addition, in 100 parts by mass of the total content of the components (a) to (d), respective contents of the components (a), (b), and (d) are preferably in the following ranges.

From the viewpoint of improving the tearing strength, bending durability, and chemical resistance of the acoustic lens, the content of the component (a) is preferably 20 to 65 parts by mass, more preferably 20 to 63 parts by mass, still more preferably 25 to 60 parts by mass, even more preferably 27 to 55 parts by mass, even still more preferably 27 to 52 parts by mass, and further more preferably 28 to 50 parts by mass. The content of the component (b) is preferably 0.3 to 3 parts by mass and more preferably 0.3 to 2 parts by mass. The content of the component (d) is preferably 1 to 20 parts by mass, more preferably 2 to 20 parts by mass, still more preferably 3 to 20 parts by mass, even more preferably 5 to 20 parts by mass, and even still more preferably 5 to 15 parts by mass.

In the particle diameter distribution of the component (c), a ratio of an area ($A^s$) of the maximal peak in a range in which the peak top is 16 nm or more and less than 100 nm to an area ($A^b$) of the maximal peak in a range in which the peak top is 8 nm or more and less than 16 nm, as $A^s$:$A^b$, is preferably 24:1 to 1:24, more preferably 15:1 to 1:15, still more preferably 10:1 to 1:10, even more preferably 5:1 to 1:5, and particularly preferably 3:1 to 1:3. In a case where two or more maximal peaks are detected in the range in which the peak top is 16 nm or more and less than 100 nm, the above-described $A^s$ is the total area of these two or more maximal peaks. In addition, in a case where two or more maximal peaks are detected in the range in which the peak top is 8 nm or more and less than 16 nm, the above-described $A^b$ is the total area of these two or more maximal peaks.

In a case where the "maximal peak in a range in which the peak top is 16 nm or more and less than 100 nm" and the "maximal peak in a range in which the peak top is 8 nm or more and less than 16 nm" overlap due to spread of each peak (for example, in a case where tail parts of the peak overlap with each other), based on 16 nm, an area on a large particle diameter side of 16 nm or more is included in the area $A^s$, and an area on a small particle diameter side of less than 16 nm is included in the area $A^b$.

In addition, with regard to the "maximal peak in a range in which the peak top is 16 nm or more and less than 100 nm", in a case where the particle diameter distribution extends to the large particle diameter of larger that 100 nm or more (in a case where the tail extends to the large particle diameter of larger than 100 nm), an area of a portion having a particle diameter larger than 100 nm is also included in $A^s$. In addition, with regard to the "maximal peak in a range in which the peak top is 8 nm or more and less than 16 nm", in a case where the particle diameter distribution extends to the small particle diameter of smaller than 8 nm (in a case where the tail extends to the small particle diameter of smaller than 8 nm), an area of a portion having a particle diameter smaller than 8 nm is also included in $A^b$.

In the particle diameter distribution of the component (c), a ratio of a height ($H^s$) of the peak top of the maximal peak in a range in which the peak top is 16 nm or more and less than 100 nm to a height ($H^b$) of the peak top of the maximal peak in a range in which the peak top is 8 nm or more and less than 16 nm, as $H^s$:$H^b$, is preferably 24:1 to 1:24, more preferably 15:1 to 1:15, still more preferably 10:1 to 1:10, even more preferably 5:1 to 1:5, and particularly preferably 3:1 to 1:3. In a case where two or more maximal peaks are detected in the range of 16 nm or more and less than 100 nm, the above-described $H^s$ is the total height of the peak tops of these two or more maximal peaks. In addition, in a case where two or more maximal peaks are detected in the range of 8 nm or more and less than 16 nm, the above-described $H^b$ is the total height of peak tops of these two or more maximal peaks.

In the component (c), a distance ([X−Y] nm) between a peak top (X nm) closest to 16 nm among the peak tops of the "maximal peak in a range in which the peak top is 16 nm or more and less than 100 nm" and a peak top (Y nm) closest to 16 nm among the peak tops of the "maximal peak in a range in which the peak top is 8 nm or more and less than 16 nm" is preferably 10 to 100 nm, more preferably 12 to 90 nm, still more preferably 13 to 80 nm, and even more preferably 14 to 70 nm.

Hereinafter, a method of obtaining the particle diameter distribution of the component (c) by the scanning transmission electron microscope described above will be described.

A cured substance of the composition according to the embodiment of the present invention is randomly cut. Regarding the cross section of the cured substance, using a field emission-scanning electron microscope "S-4800" (trade name) manufactured by Hitachi High-Tech Corporation, 50 scanning transmission electron microscope (STEM) images are taken at a magnification at which 100 to 300 silica particles can be observed, under conditions of an acceleration voltage of 15 kV. The images are imported into image analysis expression particle diameter distribution measurement software "Mac-View Ver. 4" manufactured by MOUNTECH Co., Ltd., 100 surface-treated silica particles are randomly selected on the images, and the diameter (handover length) of each of the silica particles is measured to obtain a volume-based particle diameter distribution. The baseline, the area of the maximal peak based on the baseline, and the height thereof are also automatically calculated by the above-described software.

In the surface-treated silica particles constituting the component (c), it is preferable that 50% or more of the total number of particles have a particle diameter of 8 nm or more and 100 nm or less, it is more preferable that 60% or more of the total number of particles have a particle diameter of 8 nm or more and 100 nm or less, and it is still more preferable that 70% or more of the total number of particles have a particle diameter of 8 nm or more and 100 nm or less. In addition, in the surface-treated silica particles constituting the component (c), it is preferable that 50% or more of the total number of particles have a particle diameter of 8 nm or more and less than 100 nm, it is more preferable that 60% or more of the total number of particles have a particle diameter of 8 nm or more and less than 100 nm, and it is still more preferable that 70% or more of the total number of particles have a particle diameter of 8 nm or more and less than 100 nm.

<(a) Linear Polysiloxane Having Vinyl Group>

The component (a) used in the present invention preferably has two or more vinyl groups in a molecular chain thereof.

The component (a) may be, for example, a polysiloxane (a1) having vinyl groups at least at both terminals of a molecular chain thereof (hereinafter, also simply referred to as component (a1)), or a polysiloxane (a2) having at least two $—O—Si(CH_3)_2(CH{=}CH_2)$ in a molecular chain thereof excluding the terminals (hereinafter, also simply referred to as polysiloxane (a2)). Among these, the polysiloxane (a1) having vinyl groups at least at both terminals of a molecular chain thereof is preferable.

The polysiloxane (a2) is preferably a polysiloxane (a2) in which $—O—Si(CH_3)_2(CH{=}CH_2)$ is bonded to a Si atom constituting a main chain.

The component (a) is hydrosilylated by the reaction with the component (b), for example, in the presence of a platinum catalyst. A crosslinking structure (cured body) can be formed by this hydrosilylation reaction (addition reaction).

The content of the vinyl group in the component (a) is not particularly limited. From the viewpoint of forming a sufficient network with each component contained in the composition for an acoustic lens, the content of the vinyl group is, for example, preferably 0.01 to 5 mol % and more preferably 0.05 to 2 mol %.

Here, the content of the vinyl group is mol % of a vinyl group-containing siloxane unit in a case where all units constituting the component (a) are set to 100 mol %. One vinyl group-containing siloxane unit has one to three vinyl groups. Among these, the number of vinyl groups is preferably one for one vinyl group-containing siloxane unit. For example, in a case where all Si atoms of a Si—O unit constituting the main chain and a terminal Si have at least one vinyl group, it amounts to 100 mol %.

In addition, the component (a) preferably has a phenyl group, and the content of the phenyl group in the component (a) is not particularly limited. From the viewpoint of mechanical strength in a case of being made into an acoustic lens, the content of the phenyl group is, for example, preferably 1 to 80 mol % and more preferably 2 to 40 mol %.

Here, the content of the phenyl group is mol % of a phenyl group-containing siloxane unit in a case where all units constituting the component (a) are set to 100 mol %. One phenyl group-containing siloxane unit has one to three phenyl groups. Among these, the number of phenyl groups is preferably two for one phenyl group-containing siloxane unit. For example, in a case where all Si atoms of a Si—O unit constituting the main chain and a terminal Si have at least one phenyl group, it amounts to 100 mol %.

The "unit" of polysiloxane refers to the Si—O unit constituting the main chain and the terminal Si.

A degree of polymerization and specific gravity are not particularly limited. From the viewpoint of improving the mechanical strength (tear strength) and chemical stability of the obtained acoustic lens, the viscosity of the composition before curing, and the like, the degree of polymerization is preferably 200 to 3,000 and more preferably 400 to 2,000, and the specific gravity is preferably 0.9 to 1.1.

From the viewpoint of improving the tearing strength, bending durability, and chemical resistance of the acoustic lens, a weight-average molecular weight of the component (a) is preferably 20,000 to 200,000, more preferably 40,000 to 150,000, and still more preferably 45,000 to 120,000.

In the present invention, the weight-average molecular weight can be measured, for example, by using a GPC device HLC-8220 (trade name, manufactured by Tosoh Corporation), toluene (manufactured by FUJIFILM Wako Pure Chemical Corporation) as an eluent, TSKgel G3000HXL+TSKgel G2000HXL (both trade names) as columns, and a differential refractive index (RI) detector under the conditions of a temperature of 23° C. and a flow rate of 1 mL/min.

A kinematic viscosity of the component (a) at 25° C. is preferably $1\times10^{-5}$ to 10 $m^2/s$, more preferably $1\times10^{-4}$ to 1 $m^2/s$, and still more preferably $1\times10^{-3}$ to 0.5 $m^2/s$.

The kinematic viscosity can be determined by measuring at a temperature of 25° C. using a Ubbelohde type viscometer (for example, SU: trade name, manufactured by Sibata Scientific Technology Ltd.) in accordance with JIS Z8803.

The polysiloxane (a1) having vinyl groups at least at both terminals of a molecular chain thereof is preferably a polyorganosiloxane represented by General Formula (A).

(A)

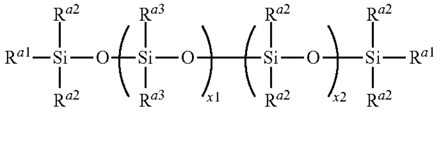

In General Formula (A), $R^{a1}$ represents a vinyl group, and $R^{a2}$ and $R^{a3}$ each independently represent an alkyl group, a cycloalkyl group, an alkenyl group, or an aryl group. x1 and x2 each independently represent an integer of 1 or more.

The number of carbon atoms in the alkyl group in $R^{a2}$ and $R^{a3}$ is preferably 1 to 10, more preferably 1 to 4, still more preferably 1 or 2, and particularly preferably 1. The alkyl group may be linear or branched, and examples thereof include methyl, ethyl, n-propyl, isopropyl, n-butyl, isobutyl, n-hexyl, n-octyl, 2-ethylhexyl, and n-decyl.

The number of carbon atoms in the cycloalkyl group in $R^{a2}$ and $R^{a3}$ is preferably 3 to 10, more preferably 5 to 10, and still more preferably 5 or 6. In addition, the cycloalkyl group is preferably a 3-membered ring, a 5-membered ring, or a 6-membered ring, and more preferably a 5-membered ring or a 6-membered ring. Examples of the cycloalkyl group include cyclopropyl, cyclopentyl, and cyclohexyl.

The number of carbon atoms in the alkenyl group in $R^{a2}$ and $R^{a3}$ is preferably 2 to 10, more preferably 2 to 4, and still more preferably 2. The alkenyl group may be linear or branched, and examples thereof include vinyl, allyl, and butenyl.

The number of carbon atoms in the aryl group in $R^{a2}$ and $R^{a3}$ is preferably 6 to 12, more preferably 6 to 10, and still more preferably 6 to 8. Examples of the aryl group include phenyl, tolyl, and naphthyl.

The alkyl group, the cycloalkyl group, the alkenyl group, and the aryl group each may have a substituent. Examples of such a substituent include a halogen atom, an alkyl group, a cycloalkyl group, an alkenyl group, an aryl group, an alkoxy group, an aryloxy group, an alkylthio group, an arylthio group, a silyl group, and a cyano group.

Examples of the group having a substituent include a halogenated alkyl group.

$R^{a2}$ and $R^{a3}$ are preferably an alkyl group, an alkenyl group, or an aryl group, more preferably an alkyl group having 1 to 4 carbon atoms, a vinyl group, or a phenyl group, still more preferably a methyl group, a vinyl group, or a phenyl group, and particularly preferably a methyl group or a phenyl group.

Among these, $R^{a2}$ is preferably a methyl group. Among these, $R^{a3}$ is preferably a methyl group, a vinyl group, or a phenyl group, more preferably a methyl group or a phenyl group, and particularly preferably a phenyl group having a large molecular area, in consideration of barrier properties.

x1 is preferably an integer of 200 to 3,000 and more preferably an integer of 400 to 2,000.

x2 is preferably an integer of 1 to 3,000, more preferably an integer of 1 to 1,000, still more preferably an integer of 40 to 1,000, and particularly preferably an integer of 40 to 700.

In addition, as another aspect, x1 is preferably an integer of 1 to 3,000 and more preferably an integer of 5 to 1,000.

In the present invention, repeating units "—$Si(R^{a3})_2$—O—" and "—$Si(R^{a2})_2$—O—" in General Formula (A) may each exist in a block-polymerized form or may be in a form that exists at random.

Examples of the polyorganosiloxane having vinyl groups at least at both terminals of a molecular chain thereof include DMS series (for example, DMS-V31, DMS-V31S15, DMS-V33, DMS-V35, DMS-V35R, DMS-V41, DMS-V42, DMS-V46, DMS-V51, and DMS-V52), PDV series (for example, PDV-0341, PDV-0346, PDV-0535, PDV-0541, PDV-1631, PDV-1635, PDV-1641, and PDV-2335), PMV-9925, PVV-3522, FMV-4031, and EDV-2022, all of which are trade names manufactured by Gelest, Inc.

The DMS-V31S15 is pre-formulated with fumed silica, so that no kneading with a special device is required.

The component (a) in the present invention may be used alone or in combination of two or more thereof.

<(b) Linear Polysiloxane Having Two or More Si—H Groups in Molecular Chain>

The component (b) used in the present invention has two or more Si—H groups in a molecular chain thereof. Here, in a case where the component (b) has a "—$SiH_2$—" structure, the number of Si—H groups in the "—$SiH_2$—" structure is counted as two. In addition, in a case where the component (b) has a "—$SiH_3$" structure, the number of Si—H groups in the "—$SiH_3$" structure is counted as three.

By having two or more Si—H groups in the molecular chain, it is possible to crosslink a polysiloxane having at least two polymerizable unsaturated groups.

From the viewpoint of mechanical strength of the acoustic lens and viscosity of the composition before curing, a weight-average molecular weight of the component (b) is preferably 500 to 100,000 and more preferably 1,500 to 50,000.

The component (b) is preferably a polyorganosiloxane represented by General Formula (B).

(B)

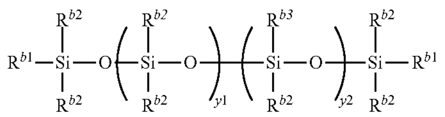

In General Formula (B), $R^{b1}$ to $R^{b3}$ each independently represent a hydrogen atom, an alkyl group, a cycloalkyl group, an alkenyl group, or an aryl group. y1 and y2 each independently represent an integer of 1 or more. Here, the molecular chain has two or more Si—H groups.

The alkyl group, the cycloalkyl group, the alkenyl group, and the aryl group in $R^{b1}$ to $R^{b3}$, have the same meanings as the alkyl group, the cycloalkyl group, the alkenyl group, and the aryl group in $R^{a2}$ and $R^{a3}$, and preferred aspects thereof are also the same.

$R^{b1}$ to $R^{b3}$ are each preferably a hydrogen atom, an alkyl group, an alkenyl group, or an aryl group, and more preferably a hydrogen atom, an alkyl group having 1 to 4 carbon atoms, a vinyl group, or a phenyl group.

Among these, $R^{b1}$ and $R^{b2}$ are each preferably a hydrogen atom, an alkyl group, an alkenyl group, or an aryl group, more preferably a hydrogen atom or an alkyl group, still more preferably a hydrogen atom or a methyl group, and particularly preferably a methyl group.

$R^{b3}$ is preferably a hydrogen atom, an alkyl group, an alkenyl group, or an aryl group, more preferably a hydrogen atom or an aryl group, still more preferably a hydrogen atom or a phenyl group, and particularly preferably a hydrogen atom.

y1 is preferably an integer of 0 to 2,000, more preferably an integer of 0 to 1,000, and still more preferably an integer of 0 to 30.

y2 is preferably an integer of 1 to 2,000, more preferably an integer of 1 to 1,000, and still more preferably an integer of 1 to 30.

y1+y2 is preferably an integer of 5 to 2,000, more preferably an integer of 7 to 1,000, still more preferably an integer of 10 to 50, and particularly preferably an integer of 15 to 30.

In the present invention, "—Si($R^{b2}$)$_2$—O—" and "—Si($R^{b2}$)($R^{b3}$)$_2$—O—" in General Formula (B) may each exist in a block-polymerized form in polysiloxane or may be in a form that exists at random.

A combination of $R^{b1}$ to $R^{b3}$ is preferably a combination of $R^{b1}$ being a hydrogen atom or an alkyl group having 1 to 4 carbon atoms, $R^{b2}$ being a hydrogen atom or an alkyl group having 1 to 4 carbon atoms, and $R^{b3}$ being a hydrogen atom or an aryl group; and more preferably a combination of $R^{b1}$ being an alkyl group having 1 to 4 carbon atoms, $R^{b2}$ being an alkyl group having 1 to 4 carbon atoms, and $R^{b3}$ being a hydrogen atom.

In this preferred combination, the content of the hydrosilyl group represented by y2/(y1+y2) is preferably more than 0.1 and 1.0 or less, and more preferably more than 0.2 and 1.0 or less.

Examples of the component (b) include HMS-064 (MeHSiO: 5 to 7 mol %), HMS-082 (MeHSiO: 7 to 8 mol %), HMS-301 (MeHSiO: 25 to 30 mol %), and HMS-501 (MeHSiO: 50 to 55 mol %) as methylhydrosiloxane-dimethylsiloxane copolymers (trimethylsiloxane terminated), HPM-502 (MeHSiO: 45 to 50 mol %) as a methylhydrosiloxane-phenylmethylsiloxane copolymer, and HMS-991 (MeHSiO: 100 mol %) as a methylhydrosiloxane polymer, all of which are manufactured by Gelest, Inc.

Here, the mol % of MeHSiO has the same meaning as that y2/(y1+y2) in the preferred combination of $R^{b1}$ to $R^{b3}$ is multiplied by 100.

From the viewpoint of preventing a progress of crosslinking reaction in the molecule, it is preferable that the component (b) does not have a vinyl group.

The component (b) used in the present invention may be used alone or in combination of two or more thereof.

<(c) Surface-Treated Silica Particles>

With regard to the surface-treated silica particles of the component (c) used in the present invention, in the particle diameter distribution (particle diameter distribution of primary particles) of the component (c) obtained by a scanning transmission electron microscope, one or more maximal peaks are detected in a range in which a peak top is 16 nm or more and less than 100 nm, and one or more maximal peaks are detected in a range in which a peak top is 8 nm or more and less than 16 nm.

In the above-described particle diameter distribution, it is preferable that there is one maximal peak at which the peak top is detected in the range of 16 nm or more and less than 100 nm. In addition, it is preferable that there is one maximal peak at which the peak top is detected in the range of 8 nm or more and less than 16 nm. In this case, it is preferable that the above-described particle diameter distribution is bimodal.

In addition, in the above-described particle diameter distribution, it is preferable that the peak top of the maximal peak is not detected in a range other than the range of 16 nm or more and less than 100 nm and the range of 8 nm or more and less than 16 nm.

In order to obtain the above-described particle diameter distribution of the component (c), for example, an aspect in which the component (c) includes at least one surface-treated silica particles having an average particle diameter (average primary particle diameter (volume-based median diameter) calculated by the scanning transmission electron microscope)) of 16 nm or more and less than 100 nm and at least one surface-treated silica particles having an average particle diameter (average primary particle diameter (volume-based median diameter) calculated by the scanning transmission electron microscope)) of 8 nm or more and less than 16 nm can be adopted. The median diameter corresponds to 50% cumulative distribution in a case where the particle diameter distribution is represented as a cumulative distribution. The "particle diameter distribution" can be obtained, for example, by a dynamic light scattering measuring device "NANOTRAC WAVE II EX150" manufactured by MicrotracBEL Corp.

The above-described average particle diameter corresponds to the peak top of the maximal peak in the particle diameter distribution.

The reason why the acoustic lens obtained by curing the composition according to the embodiment of the present invention has excellent tear strength, bending durability, and chemical resistance is not clear yet, but it is presumed that the surface-treated silica particles having the above-described particle diameter distribution are a factor in which interaction between the polysiloxane and the silica particles is increased as a whole of the silica particles.

In the particle diameter distribution of the component (c) used in the present invention, from the viewpoint of improving the tearing strength, bending durability, and chemical resistance of the acoustic lens, it is preferable that a particle diameter of the peak top of the maximal peak in the range of 16 nm or more and less than 100 nm is detected at 17 nm or more, it is more preferable to be detected at 18 nm or more, it is still more preferable to be detected at 20 nm or more, it is even more preferable to be detected at 25 nm or more, and it is particularly preferable to be detected at 30 nm or more. In addition, it is preferable that a particle diameter of the peak top of the maximal peak in the range of 16 nm or more and less than 100 nm is detected at 98 nm or less, it is more preferable to be detected at 90 nm or less, it is still more preferable to be detected at 80 nm or less, it is even more preferable to be detected at 70 nm or less, it is even still more preferable to be detected at 65 nm or less, and it is particularly preferable to be detected at 60 nm or less. Therefore, in the component (c), the particle diameter of the peak top of the maximal peak in the range of 16 nm or more and less than 100 nm is preferably detected at 17 nm or more and 98 nm or less, more preferably detected at 18 nm or more and 90 nm or less, still more preferably detected at 20 nm or more and 80 nm or less, even more preferably detected at 25 nm or more and 70 nm or less, even still more preferably detected at 30 nm or more and 65 nm or less, and particularly preferably detected at 30 nm or more and 60 nm or less.

In addition, from the same viewpoint, in the above-described particle diameter distribution of the component (c), it is preferable that a particle diameter of the peak top of the maximal peak in the range of 8 nm or more and less than 16 nm is detected a 9 nm or more and 15 nm or less.

The component (c) used in the present invention is surface-treated silica particles in which a surface of particles is treated; and is preferably silica particles surface-treated with a silane compound, which are made of the same silicon-based material, because a hydrophilic silica surface can be efficiently hydrophobized. In particular, from the viewpoint of improving the tearing strength, bending durability, and chemical resistance of the acoustic lens, the component (c) is preferably silica particles surface-treated with an aromatic silane compound (a silane compound having an aromatic ring (for example, a benzene ring)).

A method of the surface treatment may be a conventional method. Examples of the method of the surface treatment with a silane compound include a method of performing the surface treatment with a silane coupling agent and a method of coating with a silicone compound.

(i) Silane Coupling Agent

From the viewpoint of improving the tearing strength, bending durability, and chemical resistance of the acoustic lens, the silane coupling agent is preferably a silane coupling agent having a hydrolyzable group. The hydrolyzable group in the silane coupling agent is hydrolyzed by water to form a hydroxyl group, and the hydroxyl group reacts with a hydroxyl group on the surface of the silica particles by a dehydration condensation reaction, so that the surface of the silica particles is reformed and at least one characteristic of the tearing strength, the bending durability, or the chemical resistance of the acoustic lens is improved. Examples of the hydrolyzable group include an alkoxy group, an acyloxy group, and a halogen atom.

In a case where the surface of the silica particles is reformed to be hydrophobic, aggregation of the silica particles is less likely to occur, and affinity with the components (a) and (b) is improved, which is preferable from the viewpoint of improving the tearing strength, bending durability, and chemical resistance of the acoustic lens.

It is preferable that the component (c) is surface-treated with a silane coupling agent having a hydrophobic group as a functional group. Examples thereof include alkoxysilanes such as methyltrimethoxysilane (MTMS), dimethyldimethoxysilane, phenyltrimethoxysilane, methyltriethoxysilane, dimethyl diethoxysilane, phenyltriethoxysilane, n-propyltrimethoxysilane, n-propyltriethoxysilane, hexyltrimethoxysilane, hexyltriethoxysilane, and decyltrimethoxysilane; chlorosilanes such as methyltrichlorosilane, dimethyl dichlorosilane, trimethylchlorosilane, and phenyltrichlorosilane; and hexamethyldisilazane (HMDS).

In addition, examples of the silane coupling agent having a vinyl group as a functional group include alkoxysilanes such as methacryloxypropyltriethoxysilane, methacryloxypropyltrimethoxysilane, methacryloxypropylmethyldiethoxysilane, methacryloxypropylmethyldimethoxysilane, vinyltriethoxysilane, vinyltrimethoxysilane, and vinylmethyldimethoxysilane; chlorosilanes such as vinyltrichlorosilane and vinylmethyldichlorosilane; and divinyltetramethyldisilazane.

Since the effect of reforming the hydrophilic silica surface is excellent, reactivity is high, and a treatment time can be reduced, the component (c) is preferably silica particles treated with a trialkylsilylating agent, and more preferably silica particles treated with a trimethylsilylating agent.

In addition, examples of the trimethylsilylating agent include trimethylchlorosilane and hexamethyldisilazane (HMDS) described in the silane coupling agent above, and methyltrimethoxysilane (MTMS) and trimethylmethoxysilane.

The hydroxyl group present on the surface of the silica particles is reacted with hexamethyldisilazane (HMDS), methyltrimethoxysilane (MTMS), trimethylmethoxysilane, or the like to be covered with a trimethylsilyl group, and the surface of the silica particles is reformed to be hydrophobic.

In the present invention, the silane coupling agent may be used alone or in combination of two or more kinds thereof.

(ii) Silicone Compound

In the component (c), the silicone compound coating the silica particles may be a polymer including a siloxane bond.

Examples of the silicone compound include a silicone compound in which any one or both of a side chain and a terminal of the polysiloxane are partially or entirely a methyl group; a silicone compound in which a part of a side chain is a hydrogen atom; a modified silicone compound in which at least one organic group such as an amino group and an epoxy group is introduced into all or a part of a side chain and a terminal of the polysiloxane; and a silicone resin having a branched structure. The silicone compound may have a linear or cyclic structure.

Examples of the silicone compound in which any or both of the side chain and the terminal of the polysiloxane are partially or entirely a methyl group include monomethyl polysiloxanes such as polymethylhydroxysiloxane (hydrogen-terminated), polymethylhydroxysiloxane (trimethylsiloxy-terminated), polymethylphenylsiloxane (hydrogen-terminated), and polymethylphenylsiloxane (trimethylsiloxy-terminated); and dimethyl polysiloxanes such as dimethyl polysiloxane (hydrogen-terminated), dimethyl polysiloxane (trimethylsiloxy-terminated), and cyclic dimethyl polysiloxane.

Examples of the silicone compound in which a part of a side chain is a hydrogen atom include a methylhydrosiloxane-dimethylsiloxane copolymer (trimethylsiloxy-terminated), a methylhydrosiloxane-dimethylsiloxane copolymer (hydrogen-terminated), polymethylhydrosiloxane (hydrogen-terminated), polymethylhydrosiloxane (trimethylsiloxy-terminated), polyethylhydrosiloxane (triethylsiloxy-terminated), polyphenyl-(dimethylhydrosyloxy) siloxane (hydrogen-terminated), a a methylhydrosiloxane-phenylmethylsiloxane copolymer (hydrogen-terminated), and a methylhydrosiloxane-octylmethylsiloxane copolymer, methylhydrosiloxane-octylmethylsiloxane-dimethylsiloxane terpolymer.

In addition, examples of the modified silicone in which the organic group is introduced include a reactive silicone in which at least one of an amino group, an epoxy group, a methoxy group, a (meth)acryloyl group, a phenol (hydroxyphenyl) group, a carboxylic acid anhydride group, a hydroxy group, a mercapto (sulfanyl) group, or a carboxy group is introduced; and a non-reactive silicone modified with at least one of a polyether, an aralkyl, a fluoroalkyl, a long-chain alkyl, a long-chain aralkyl, a higher fatty acid ester, a higher fatty acid amide, or a polyethermethoxy.

The silica particles coated with a silicone compound can be obtained by a conventional method. For example, the silica particles coated with a silicone compound are obtained by mixing and stirring the silica particles in dimethyl polysiloxane for a certain period of time and filtering the mixture.

In addition, in a case where the reactive modified silicone is used as the silicone compound, the surface of the silica particles is refined by the organic group reacting with the hydroxyl group on the surface of the silica particles, and at least one characteristic of the tearing strength, the bending durability, or the chemical resistance of the acoustic lens is improved.

In the present invention, for example, a commercially available silane compound can be used.

From the viewpoint of improving the tearing strength, bending durability, and chemical resistance of the acoustic lens, a methanol hydrophobicity degree of the component (c) is preferably 40% to 80% by mass, more preferably 50% to 80% by mass, and still more preferably 60% to 80% by mass. Here, a larger methanol hydrophobicity degree indicates a higher hydrophobicity, and a smaller methanol hydrophobicity degree indicates a higher hydrophilicity. The methanol hydrophobicity degree can be controlled, for example, by the type and amount of the compound used for the surface treatment.

A calculation method of the methanol hydrophobicity degree will be described.

50 mL of ion exchange water and 0.2 g of the silica particles as a sample are put into a beaker and the temperature is set to 25° C., and methanol is added dropwise from a burette to the beaker while stirring with a magnetic stirrer, and an amount (X g) of methanol added dropwise until the entire amount of the sample sinks is measured. The methanol hydrophobicity degree is calculated from the following expression.

$$\text{Methanol hydrophobicity degree (\% by mass)} = X/(50+X)\times 100$$

From the viewpoint of improving the tearing strength, bending durability, and chemical resistance of the acoustic lens, a sphericity of Wadell in the primary particle of the component (c) is preferably 0.7 to 1, more preferably 0.8 to 1, and still more preferably 0.9 to 1.

Here, the "sphericity of Wadell" (see Chemical Engineering Handbook, published by Maruzen Co., Ltd.) is an index for measuring sphericity of a particle by (Diameter of circle equal to projected area of particle)/(Diameter of minimum circle circumscribing projected image of particle), and it means that the particle is closer to a true sphere as the index is closer to 1.0.

For the measurement of the sphericity of Wadell (hereinafter, also simply referred to as sphericity), for example, a scanning electron microscope (SEM) image can be used. Specifically, for example, approximately 100 primary particles are observed with the SEM image, and the sphericity of the primary particles is calculated. An average value obtained by dividing the calculated total of sphericity by the number of the observed primary particles is defined as the sphericity.

The above-described shape is a shape of the silica particles in a surface-treated state.

In the present specification, "true sphere shape" means that the sphericity of Wadell is in a range of 0.9 to 1. That is, the "true sphere shape" includes not only a perfect sphere but also a slightly distorted sphere.

The silica particles are roughly classified according to the production method thereof into combustion method silica (that is, fumed silica) obtained by burning a silane compound, explosion method silica obtained by explosively burning metal silicon powder, wet silica obtained by a neutralization reaction of sodium silicate and mineral acid (silica obtained by synthesis under alkaline conditions is called sedimentation method silica and silica obtained by synthesis under acidic conditions is called gel method silica), and sol-gel method silica obtained by hydrolysis of hydrocarbyloxy silane (so-called Stoeber method).

Examples of a method for producing the true sphere-shaped spherical silica particles include an explosion method and a sol-gel method, which are preferable.

The sol-gel method is a method of obtaining hydrophilic spherical silica particles essentially consisting of $SiO_2$ units by hydrolyzing and condensing a hydrocarbyloxysilane (preferably, tetrahydrocarbyloxysilane), a partially hydrolyzed and condensed product of the hydrocarbyloxysilane, or a combination thereof.

In addition, the hydrophobic treatment of the surface of the silica particles can be performed by introducing an $R^3_3SiO_{1/2}$ unit ($R^3$'s are the same or different from each other, and are a substituted or unsubstituted monovalent hydrocarbon group having 1 to 20 carbon atoms) onto the hydrophilic surface of the spherical silica particles.

Specifically, for example, the hydrophobic treatment can be performed by methods described in JP2007-99582A and JP2014-114175A.

<(d) Polysiloxane Resin>

The polysiloxane resin is a polysiloxane compound having a three-dimensional network structure. The component (d) used in the present invention is not particularly limited, but a polysiloxane resin including an $SiO_{4/2}$ unit (Q unit) and an $R_3SiO_{1/2}$ unit (M unit) is preferable. In the M unit, R represents a monovalent hydrocarbon group. R may or may not have a carbon-carbon unsaturated bond. It is preferable that at least one of M units constituting the polysiloxane resin includes a monovalent unsaturated hydrocarbon group having a carbon-carbon unsaturated bond. However, the carbon-carbon unsaturated bond does not include a carbon-carbon double bond in an aromatic ring.

The number of carbon atoms in the above-described monovalent hydrocarbon group not having a carbon-carbon unsaturated bond is preferably 1 to 18, more preferably 1 to 10, and particularly preferably 1 to 8. Specific examples thereof include a linear or branched alkyl group such as methyl, ethyl, propyl, i-propyl, butyl, isobutyl, t-butyl, pentyl, neopentyl, hexyl, cyclohexyl, octyl, nonyl, and decyl; an aryl group such as phenyl, tolyl, xylyl, and naphthyl; an aralkyl group such as benzyl, phenylethyl, and phenylpropyl; and a monovalent group in which a part or all of hydrogen atoms of these groups are substituted with at least one functional group of a halogen atom such as a fluorine atom, a bromine atom, and a chlorine atom, or a cyano group, for example, chloromethyl, chloropropyl, bromoethyl, trifluoropropyl, and cyanoethyl. Among these, methyl is preferable.

The number of carbon atoms in the above-described monovalent unsaturated hydrocarbon group having a carbon-carbon unsaturated bond is preferably 2 to 18, more preferably 2 to 10, still more preferably 2 to 8, and particularly preferably 2 to 6. Examples of the monovalent unsaturated hydrocarbon group having a carbon-carbon unsaturated bond include a linear or branched alkenyl group and a linear or branched alkynyl group, and an alkenyl group is preferable. Specific examples of the monovalent unsaturated hydrocarbon group having a carbon-carbon unsaturated bond include vinyl, allyl, propenyl, i-propenyl, butenyl, hexenyl, cyclohexenyl, and octenyl. Among these, vinyl is preferable.

From the viewpoint of improving the tearing strength, bending durability, and chemical resistance of the acoustic lens, a molar ratio (M/Q) of the $R_3SiO_{1/2}$ unit (M unit) to the $SiO_{4/2}$ unit (Q unit) is preferably 0.1 to 3.0, more preferably 0.3 to 2.5, still more preferably 0.5 to 2.0, even more preferably 0.6 to 1.2, and particularly preferably 0.7 to 1.2. The component (d) may include an $R_2SiO_{2/2}$ unit (D unit) and an $RSiO_{3/2}$ unit (T unit) in the molecule. R in the D unit and the T unit has the same meaning as R in the M unit, and preferred ranges thereof are also the same.

The component (d) preferably has at least two monovalent unsaturated hydrocarbon groups having a carbon-carbon unsaturated bond in one molecule, and a content of the monovalent unsaturated hydrocarbon groups having a carbon-carbon unsaturated bond in the component (d) is preferably $1\times10^{-5}$ to $1\times10^{-2}$ mol/g and more preferably $1\times10^{-4}$ to $2\times10^{-3}$ mol/g.

In the composition according to the embodiment of the present invention, a matrix of resin is formed through the component (d) to obtain an overall uniform and dense cured substance (acoustic lens). Since the tear strength, bending durability, and chemical resistance of the cured substance are more excellent, it is preferable that the component (d) consists of the $SiO_{4/2}$ unit (Q unit) and the $R_3SiO_{1/2}$ unit (M unit), and has at least two vinyl groups in one molecule.

It is more preferable that the component (d) consists of one kind of the Q unit ($SiO_{4/2}$ unit) and two kinds of the M units ($R^1_2R^2SiO_{1/2}$ unit and $R^1_3SiO_{1/2}$ unit).

Here, $R^1$ represents the above-described monovalent hydrocarbon group not having a carbon-carbon unsaturated bond, and $R^2$ represents the above-described unsaturated hydrocarbon group.

The component (d) is particularly preferably represented by the following average compositional formula (1).

$$(SiO_{4/2})_b(R^1_2R^2SiO_{1/2})_c(R^1_3SiO_{1/2})_d \quad \text{Average compositional formula (1):}$$

In the formula, b, c, and d each represent a positive number, $R^1$ represents the above-described monovalent hydrocarbon group not having a carbon-carbon unsaturated bond, and $R^2$ represents the above-described unsaturated hydrocarbon group.

In the present invention, the component (d) is a solid or a viscous liquid at room temperature (25° C.). A weight-average molecular weight of the component (d) is not particularly limited, but is preferably a weight-average molecular weight at which a kinematic viscosity of a 50% by mass xylene solution of the component (d) is 0.5 to 10 $mm^2/s$, and more preferably a weight-average molecular weight at which a kinematic viscosity of a 50% by mass xylene solution of the component (d) is 1.0 to 5.0 $mm^2/s$. The above-described kinematic viscosity is a value measured at 25° C. using an Ubbelohde-type Ostwald viscometer. The viscosity of the component (d) within the above-described range does not reduce the physical properties of the composition, which is preferable.

The polysiloxane resin is available on the market. For example, VQX-221 (xylene solution) commercially available from Gelest, Inc. can be used.

The component (d) used in the present invention may be used alone or in combination of two or more thereof.

<Other Components>

In addition to the components (a) to (d), at least one of a catalyst for an addition polymerization reaction, a curing retarder, a solvent, a dispersant, a pigment, a dye, an antistatic agent, an antioxidant, a flame retardant, a thermal conductivity improver, or the like can be appropriately formulated in the composition for an acoustic lens according to the embodiment of the present invention.

—Catalyst—

Examples of the catalyst include platinum or a platinum-containing compound (hereinafter, also simply referred to as a platinum compound). An ordinary platinum or platinum compound can be used as the platinum or platinum compound.

Specific examples thereof include platinum black or platinum supported on an inorganic compound or carbon black, chloroplatinic acid or an alcohol solution of chloroplatinic acid, a complex salt of chloroplatinic acid and olefin, and a complex salt of chloroplatinic acid and vinyl siloxane. The catalyst may be used alone or in combination of two or more thereof.

The catalyst is effective in a hydrosilylation reaction in which the Si—H group is added to the vinyl group. The hydrosilylation reaction (addition curing reaction) proceeds to form a silicone resin derived from the components (a) and (b). In addition, it is possible to form a highly three-dimensional network structure by the components (a), (b), and (d). A molar ratio of the Si—H group and the vinyl group in the hydrosilylation reaction can be determined based on a stoichiometric ratio, but is not limited thereto.

Here, the catalyst may be contained in the composition for an acoustic lens according to the embodiment of the present invention, or may be brought into contact with the composition for an acoustic lens without being contained in the composition for an acoustic lens.

Examples of commercially available platinum catalysts include platinum compounds (trade name: PLATINUM CYCLOVINYLMETHYLSILOXANE COMPLEX IN CYCLIC METHYLVINYLSILOXANES (SIP6832.2), Pt concentration: 2% by mass, and trade name: PLATINUM DIVINYLTETRAMETHYLDISILOXANE COMPLEX IN VINYL-TERMINATED POLYDIMETHYLSILOXANE (SIP6830.3), Pt concentration: 3% by mass; both manufactured by Gelest, Inc.).

In a case where the catalyst is contained in the composition for an acoustic lens according to the embodiment of the present invention, in order to maintain each component in a stable state without reacting with each other or to sufficiently suppress the reaction between the components, it is preferable that the above-described composition is stored at a low temperature to a level at which the reaction is substantially not carried out. For example, the composition can be stored at 10° C. or lower, preferably 0° C. or lower, more preferably −10° C. or lower, and still more preferably −20° C. or lower. In addition, the composition can be stored in a light-shielded manner as necessary.

In a case where the catalyst is contained in the composition for an acoustic lens according to the embodiment of the present invention, a content of the catalyst is not particularly limited. In a case of not containing the component (d), from the viewpoint of reactivity, the content of the catalyst is preferably 0.00001 to 0.05 parts by mass, more preferably 0.00001 to 0.01 parts by mass, still more preferably 0.00002 to 0.01 parts by mass, and particularly preferably 0.00005 to 0.005 parts by mass with respect to the total of 100 parts by mass of the components (a) to (c). From the same viewpoint, in a case of containing the component (d), the content of the catalyst is preferably 0.00001 to 0.05 parts by mass, more preferably 0.00001 to 0.01 parts by mass, still more preferably 0.00002 to 0.01 parts by mass, and particularly preferably 0.00005 to 0.005 parts by mass with respect to the total of 100 parts by mass of the components (a) to (d).

In addition, the curing temperature can be adjusted by selecting an appropriate platinum catalyst. For example, platinum-vinyl disiloxane is used for room temperature curing (RTV) at 50° C. or lower, and platinum-cyclic vinyl siloxane is used for high temperature curing (HTV) at 130° C. or higher.

—Curing Retarder—

In the present invention, a curing retarder for the curing reaction can be appropriately used. The curing retarder is used for the purpose of delaying the above-described addition curing reaction, and examples thereof include a low molecular weight vinyl methylsiloxane homopolymer (trade name: VMS-005, manufactured by Gelest, Inc.).

A curing rate, that is, a working time can be adjusted depending on the content of the curing retarder.

[Viscosity of Composition for Acoustic Lens Before Curing]

A viscosity of the composition for an acoustic lens before the curing reaction is preferably low from the viewpoint of uniformly dispersing the components (a) to (d). The viscosity of the composition for an acoustic lens is measured before adding the catalyst for initiating the curing reaction, from the viewpoint of measuring the viscosity before curing. Specifically, the viscosity of the composition for an acoustic lens can be measured by the method described in WO2017/130890A.

The above-described viscosity (23° C.) is preferably 5,000 Pa·s or less, more preferably 1,000 Pa·s or less, and particularly preferably 200 Pa·s or less. The practical lower limit thereof is 10 Pa·s or more.

<Method for Manufacturing Composition for Acoustic Lens, Acoustic Lens, and Acoustic Wave Probe>

The composition for an acoustic lens according to the embodiment of the present invention can be prepared by a conventional method.

The composition for an acoustic lens according to the embodiment of the present invention can be obtained, for example, by kneading the components constituting the composition for an acoustic lens using a kneader, a pressurized kneader, a Banbury mixer (continuous kneader), a two-roll kneading device, or the like. The mixing order of each component is not particularly limited. Kneading conditions are not particularly limited, and the kneading is preferably carried out, for example, at 10° C. to 50° C. for 1 to 72 hours.

A silicone resin can be obtained by curing the composition for an acoustic lens according to the embodiment of the present invention thus obtained. Specifically, for example, a silicone resin can be obtained by heat-curing the composition for an acoustic lens at 20° C. to 200° C. for 5 to 500 minutes. A shape of the above-described silicone resin is not particularly limited. For example, the silicone resin may be formed into a preferred shape as an acoustic lens by a mold during the curing, or may be used as a desired acoustic lens by obtaining a sheet-like silicone resin and cutting the resin.

The composition for an acoustic lens according to the embodiment of the present invention is useful for medical members, and can be preferably used, for example, in an acoustic wave probe and an acoustic wave measurement apparatus. The acoustic wave measurement apparatus according to the embodiment of the present invention is not limited to an ultrasound diagnostic apparatus or a photoacoustic wave measurement apparatus, but refers to a device that receives an acoustic wave reflected or generated by an object and displays the received acoustic wave as an image or a signal intensity.

In particular, the composition for an acoustic lens according to the embodiment of the present invention can be suitably used as a material for an acoustic lens of a probe for an ultrasound diagnostic apparatus, a material for an acoustic lens in a photoacoustic wave measurement apparatus or an ultrasonic endoscope, a material for an acoustic lens in an ultrasound probe equipped with a capacitive micromachined ultrasonic transducer (cMUT) as an ultrasonic transducer array, or the like.

Specifically, the acoustic lens according to the embodiment of the present invention is preferably applied to an acoustic wave measurement apparatus such as the ultrasound diagnostic apparatus described in JP2003-169802A and the like, or the photoacoustic wave measurement apparatus described in JP2013-202050A, JP2013-188465A, and the like.

The acoustic wave probe according to the embodiment of the present invention can be manufactured by a conventional method, except that an acoustic lens is formed of the composition for an acoustic lens according to the embodiment of the present invention.

<<Acoustic Wave Probe>>

The configuration of the acoustic wave probe according to the embodiment of the present invention will be described in more detail below based on the configuration of the ultrasound probe in the ultrasound diagnostic apparatus described in the FIGURE. The ultrasound probe is a probe which particularly uses an ultrasonic wave as an acoustic wave in an acoustic wave probe. Therefore, a basic structure of the ultrasound probe can be applied to the acoustic wave probe as it is.

—Ultrasound Probe—

An ultrasound probe 10 is a main component of the ultrasound diagnostic apparatus and has a function of generating an ultrasonic wave and transmitting and receiving an ultrasonic beam. As shown in the FIGURE, a configuration of the ultrasound probe 10 is provided in the order of an acoustic lens 1, an acoustic matching layer 2, a piezoelectric element layer 3, and a backing material 4 from a distal end portion (surface coming into contact with a living body which is a test object). In recent years, an ultrasound probe having a laminated structure in which an ultrasonic transducer (piezoelectric element) for transmission and an ultrasonic transducer (piezoelectric element) for reception are formed of materials different from each other has been proposed in order to receive high-order harmonics.

<Piezoelectric Element Layer>

The piezoelectric element layer 3 is a portion which generates an ultrasonic wave and in which an electrode is attached to both sides of a piezoelectric element. In a case where voltage is applied to the electrode, the piezoelectric element layer 3 generates an ultrasonic wave through repeated contraction and expansion of the piezoelectric element and through vibration.

A so-called ceramics inorganic piezoelectric body obtained by a polarization treatment of quartz crystals, single crystals such as $LiNbO_3$, $LiTaO_3$, and $KNbO_3$, thin films of ZnO and AlN, $Pb(Zr,Ti)O_3$-based sintered body, and the like is widely used as the material constituting a piezoelectric element. In general, piezoelectric ceramics such as lead zirconate titanate (PZT) with good conversion efficiency are used.

In addition, sensitivity having a wider band width is required for a piezoelectric element detecting a reception wave on a high frequency side. For this reason, an organic piezoelectric body has been used in which an organic polymer material such as polyvinylidene fluoride (PVDF) is used as the piezoelectric element being suitable for a high frequency or a wide band.

Furthermore, cMUT using micro electro mechanical systems (MEMS) technology in which an array structure, which shows excellent short pulse characteristics, excellent wideband characteristics, and excellent mass productivity and has less characteristic variations, is obtained is described in JP2011-071842A or the like.

In the present invention, it is possible to preferably use any piezoelectric element material.

<Backing Material>

The backing material 4 is provided on a rear surface of the piezoelectric element layer 3 and contributes to the improvement in distance resolution in an ultrasound diagnostic image by shortening the pulse width of an ultrasonic wave through the suppression of excess vibration.

<Acoustic Matching Layer>

The acoustic matching layer 2 is provided in order to reduce the difference in acoustic impedance between the piezoelectric element layer 3 and a test object and to efficiently transmit and receive an ultrasonic wave.

<Acoustic Lens>

The acoustic lens 1 is provided to focus an ultrasonic wave in a slice direction by utilizing refraction to improve the resolution. In addition, it is necessary for the acoustic lens to achieve matching of an ultrasonic wave with acoustic impedance (1.4 to 1.7 Mrayl in a case of a human body) of a living body which is a test object after being closely attached to the living body.

That is, sensitivity of transmission and reception of an ultrasonic wave is improved using a material of which the acoustic velocity is sufficiently lower than that of a human body, and the acoustic impedance is close to a value of the skin of a human body, as the material of the acoustic lens 1.

The composition for an acoustic lens according to the embodiment of the present invention can be preferably used as an acoustic lens material.

The operation of the ultrasound probe 10 having such a configuration will be described. The piezoelectric element layer 3 is resonated after applying a voltage to the electrodes provided on both sides of the piezoelectric element layer 3, and an ultrasonic signal is transmitted to a test object from the acoustic lens 1. During reception of the ultrasonic signal, the piezoelectric element layer 3 is vibrated using the signal (echo signal) reflected from the test object and this vibration is electrically converted into a signal to obtain an image.

In particular, it is possible to confirm for the acoustic lens obtained from the composition for an acoustic lens according to the embodiment of the present invention to have a significant sensitivity improving effect at a transmission frequency of an ultrasonic wave of about 10 MHz or higher as a general medical ultrasonic transducer. A particularly significant sensitivity improving effect can be expected particularly at a transmission frequency of an ultrasonic wave of 15 MHz or higher.

The acoustic lens obtained from the composition for an acoustic lens according to the embodiment of the present invention can reduce the acoustic velocity to, for example, less than 900 m/s, and with an ultrasonic frequency of 10 MHz or more and less than 50 MHz, it is possible to obtain sufficiently accurate information about with regard to living tissues at a depth of 0.1 to 20 mm from a body surface.

Hereinafter, a device in which the acoustic lens obtained from the composition for an acoustic lens according to the embodiment of the present invention exerts a particular function with respect to the problems of the related art will be described in detail.

The composition for an acoustic lens according to the embodiment of the present invention also exhibits excellent effects on devices other than those described below.

—Ultrasound Probe Equipped with Capacitive Micromachined Ultrasonic Transducer (cMUT)—

In a case where the cMUT device described in JP2006-157320A, JP2011-71842A, or the like is used in an ultrasonic transducer array, its sensitivity is generally lower than that of a transducer using general piezoelectric ceramics (PZT).

However, by using the acoustic lens obtained from the composition for an acoustic lens according to the embodiment of the present invention, it is possible to compensate for the lack of sensitivity of cMUT. As a result, it is possible to bring the sensitivity of the cMUT closer to the performance of a transducer of the related art.

Since the cMUT device is produced by MEMS technology, it is possible to provide the market with an ultrasound probe having higher mass productivity and lower cost than a piezoelectric ceramic probe.

—Photoacoustic Wave Measurement Apparatus Using Photoacoustic Imaging—

Photoacoustic imaging (PAI) described in JP2013-158435A or the like displays an image or a signal intensity of an ultrasonic wave generated in a case where the inside of a human body is irradiated with light (an electromagnetic wave), and the human tissue adiabatically expands due to the irradiated light.

—Ultrasonic Endoscope—

Since the signal line cable of the ultrasonic endoscope described in JP2008-311700A or the like is longer than that of a transducer for the body surface due to its structure, it is a problem to improve the sensitivity of the transducer due to the cable loss of an ultrasonic wave. In addition, it is said that there is no effective method for improving sensitivity for this problem for the following reasons.

First, in a case where it is an ultrasound diagnostic apparatus for the body surface, an amplifier circuit, an AD conversion IC, or the like can be installed at the tip of a transducer. On the other hand, since an ultrasonic endoscope is used by insertion thereof into the body, an installation space of a transducer is narrow, and it is difficult to install an amplifier circuit, an AD conversion IC, or the like at the tip of the transducer.

Secondly, a piezoelectric single crystal used in a transducer in an ultrasound diagnostic apparatus for the body surface is difficult to apply to a transducer with a transmission frequency of an ultrasonic wave of 10 to 15 MHz or higher due to its physical characteristics and process suitability. Meanwhile, since an ultrasonic wave for an endoscope is generally a probe having a transmission frequency of an ultrasonic wave of 10 to 15 MHz or higher, it is difficult to improve the sensitivity by using a piezoelectric single crystal material.

However, by using the acoustic lens obtained from the composition for an acoustic lens according to the embodiment of the present invention, it is possible to improve the sensitivity of an ultrasonic transducer for an endoscope.

In addition, even in a case where the same transmission frequency of an ultrasonic wave (for example, 15 MHz) is used, it is particularly effective in a case where the acoustic lens obtained from the composition for an acoustic lens according to the embodiment of the present invention is used in an ultrasonic transducer for an endoscope.

EXAMPLES

Hereinafter, the present invention will be described in more detail with reference to Examples. The present invention is not limited to Examples below, except as specified in the present invention.

Example 1

49.4 parts by mass of a vinyl-terminated diphenylsiloxane-dimethylsiloxane copolymer (component (a) in Table 1 ("Table 1" means "Table 1-1" to "Table 1-3" described later; "PDV-0541" (trade name) manufactured by Gelest, Inc., weight-average molecular weight: 60,000), 0.6 parts by mass of a polymethylhydrosiloxane (component (b) in Table 1; "HMS-991" (trade name) manufactured by Gelest, Inc.; weight-average molecular weight: 1,600, Si—H equivalent: 67 g/mol), 25 parts by mass of surface-treated true sphere-shaped silica particles (component (c)-1 in Table 1; "QSG-30" manufactured by Shin-Etsu Chemical Co., Ltd.; average particle diameter: 30 nm), and 25 parts by mass of surface-treated true sphere-shaped silica particles (component (c)-2 in Table 1; "YA010C" manufactured by Admatechs; average particle diameter: 10 nm) were kneaded with a kneader at a temperature of 23° C. for 2 hours to obtain a uniform paste. A platinum catalyst solution (SIP6832.2 manufactured by Gelest, Inc., platinum concentration: 2%) was added at 500 ppm (10 ppm in terms of platinum; ppm is based on mass) to the paste which was then mixed, defoamed under reduced pressure, placed in a 150 mm×150 mm metal mold, and heat-treated at 60° C. for 3 hours to obtain a silicone resin sheet having a thickness of 1.0 mm.

Examples 2 to 62 and Comparative Examples 1 to 7

Silicone resin sheets of Examples 2 to 62 and Comparative Examples 1 to 7 were produced in the same manner as in Example 1, except that the composition of Example 1 in Table 1 was changed to the compositions of Examples 2 to 62 and Comparative Examples 1 to 7 in Table 1. All of the platinum catalyst solutions were used in the same amount as in Example 1. In addition, in Examples 1 to 28, the component (d) was not used.

In each of Examples, all particle diameter distribution was bimodal. In addition, in each of Examples, a content ratio (content of the component (c)-1:content of the component (c)-2) of the components (c)-1 and (c)-2 in Table 1 corresponds to the area ratio ($A^s$:$A^b$) determined by the above-described method and corresponds to the ratio of the height of the peak top ($H^s$:$H^b$) determined by the above-described method.

In addition, in each of Examples, 70% or more of the total number of particles in the entirety of the combined component (c)-1 and the component (c)-2 had a particle diameter of 8 nm or more and less than 100 nm.

<Evaluation of Tear Strength, Bending Durability, and Chemical Resistance>

The following evaluations were performed on the silicone resin sheets of Examples 2 to 62 and Comparative Examples 1 to 7. The obtained results are summarized and shown in Table 1 below.

[Tear Strength Test]

A trouser-shaped test piece was produced from the above-described silicone resin sheet having a thickness of 1.0 mm according to JIS K6252-1 (2015), and the tear strength was measured and evaluated based on the following evaluation standard.

<Evaluation Standard>

AA: 50 N/cm or more

A: 30 N/cm or more and less than 50 N/cm

B: 20 N/cm or more and less than 30 N/cm

C: 10 N/cm or more and less than 20 N/cm

D: less than 10 N/cm

[Bending Durability Test]

With regard to the above-described silicone resin sheet having a thickness of 1.0 mm, a bending crack occurrence test was performed according to JIS K6260 (2017), and the number of bending times until a crack of more than 0.5 mm was generated was evaluated according to the following standard.

<Evaluation Standard>

A: 500,000 times or more

B: 300,000 times or more and less than 500,000 times

C: 100,000 times or more and less than 300,000 times

D: less than 100,000 times

[Peracetic Acid Immersion (Chemical Resistance) Test]

The obtained silicone resin sheet was immersed in an aqueous solution of peracetic acid (manufactured by FUJIFILM Wako Pure Chemical Corporation, trade name: ESCIDE) adjusted to 55° C. while exchanging the aqueous solution with a new aqueous solution of peracetic acid every 40 hours, and was immersed for a total of 160 hours. A tensile test (in accordance with the method of JIS K6251 (2017), a dumbbell-shaped test piece (first form)) was performed on each of the silicone resin sheets before and after the immersion, and each breaking elongation was calculated by the following expression.

Breaking elongation (%)=100×(Distance between chucks at breakage−Distance between chucks before test)/Distance between chucks before test The obtained breaking elongation was adopted to the following evaluation standard to evaluate chemical resistance.

<Evaluation Standard>

A: 80% or more
B: 60% or more and less than 80%
C: 50% or more and less than 60%
D: 40% or more and less than 50%
E: less than 40%

TABLE 1-1

| | Component (a) | | Component (b) | | Component (c)-1 | | | | Component (c)-2 | |
|---|---|---|---|---|---|---|---|---|---|---|
| | Type | Content [part by mass] | Type | Content [part by mass] | Type | Maximal value [nm] | Shape | Content [part by mass] | Type | Maximal value [nm] |
| Example 1 | a-1 | 49.4 | b-1 | 0.6 | c-1 | 30 | True sphere shape | 25.0 | c-5 | 10 |
| Example 2 | a-1 | 49.4 | b-1 | 0.6 | c-2 | 50 | True sphere shape | 25.0 | c-5 | 10 |
| Example 3 | a-1 | 49.4 | b-1 | 0.6 | c-3 | 80 | True sphere shape | 25.0 | c-5 | 10 |
| Example 4 | a-1 | 49.4 | b-1 | 0.6 | c-1 | 30 | True sphere shape | 25.0 | c-6 | 12 |
| Example 5 | a-1 | 49.4 | b-1 | 0.6 | c-2 | 50 | True sphere shape | 25.0 | c-6 | 12 |
| Example 6 | a-1 | 49.4 | b-1 | 0.6 | c-3 | 80 | True sphere shape | 25.0 | c-6 | 12 |
| Example 7 | a-1 | 49.4 | b-1 | 0.6 | c-1 | 30 | True sphere shape | 25.0 | c-7 | 15 |
| Example 8 | a-1 | 49.4 | b-1 | 0.6 | c-2 | 50 | True sphere shape | 25.0 | c-7 | 15 |
| Example 9 | a-1 | 49.4 | b-1 | 0.6 | c-3 | 80 | True sphere shape | 25.0 | c-7 | 15 |
| Example 10 | a-1 | 49.4 | b-1 | 0.6 | c-2 | 50 | True sphere shape | 48.0 | c-7 | 15 |
| Example 11 | a-1 | 49.4 | b-1 | 0.6 | c-2 | 50 | True sphere shape | 45.0 | c-7 | 15 |
| Example 12 | a-1 | 49.4 | b-1 | 0.6 | c-2 | 50 | True sphere shape | 40.0 | c-7 | 15 |
| Example 13 | a-1 | 49.4 | b-1 | 0.6 | c-2 | 50 | True sphere shape | 35.0 | c-7 | 15 |
| Example 14 | a-1 | 49.4 | b-1 | 0.6 | c-2 | 50 | True sphere shape | 15.0 | c-7 | 15 |
| Example 15 | a-1 | 49.4 | b-1 | 0.6 | c-2 | 50 | True sphere shape | 10.0 | c-7 | 15 |
| Example 16 | a-1 | 49.4 | b-1 | 0.6 | c-2 | 50 | True sphere shape | 3.0 | c-7 | 15 |
| Example 17 | a-1 | 49.4 | b-1 | 0.6 | c-2 | 50 | True sphere shape | 2.0 | c-7 | 15 |
| Example 18 | a-1 | 69.2 | b-1 | 0.8 | c-2 | 50 | True sphere shape | 15.0 | c-7 | 15 |
| Example 19 | a-1 | 59.3 | b-1 | 0.7 | c-2 | 50 | True sphere shape | 20.0 | c-7 | 15 |
| Example 20 | a-1 | 39.5 | b-1 | 0.5 | c-2 | 50 | True sphere shape | 30.0 | c-7 | 15 |
| Example 21 | a-1 | 31.6 | b-1 | 0.4 | c-2 | 50 | True sphere shape | 34.0 | c-7 | 15 |
| Example 22 | a-2 | 49.1 | b-1 | 0.9 | c-2 | 50 | True sphere shape | 25.0 | c-7 | 15 |
| Example 23 | a-3 | 49.6 | b-1 | 0.4 | c-2 | 50 | True sphere shape | 25.0 | c-7 | 15 |
| Example 24 | a-4 | 49.5 | b-1 | 0.5 | c-2 | 50 | True sphere shape | 25.0 | c-7 | 15 |
| Example 25 | a-5 | 49.4 | b-1 | 0.6 | c-2 | 50 | True sphere shape | 25.0 | c-7 | 15 |
| Example 26 | a-6 | 49.3 | b-1 | 0.7 | c-2 | 50 | True sphere shape | 25.0 | c-7 | 15 |
| Example 27 | a-7 | 48.4 | b-1 | 1.6 | c-2 | 50 | True sphere shape | 25.0 | c-7 | 15 |
| Example 28 | a-1 | 48.9 | b-2 | 1.1 | c-2 | 50 | True sphere shape | 25.0 | c-7 | 15 |

| | Component (c)-2 | | Component (d) | | | | |
|---|---|---|---|---|---|---|---|
| | Shape | Content [part by mass] | Type | Content [part by mass] | Tear strength | Bending durability | Chemical resistance |
| Example 1 | True sphere shape | 25.0 | | | B | C | B |
| Example 2 | True sphere shape | 25.0 | | | B | B | B |
| Example 3 | True sphere shape | 25.0 | | | C | B | B |
| Example 4 | Irregular shape | 25.0 | | | B | C | C |
| Example 5 | Irregular shape | 25.0 | | | B | B | C |
| Example 6 | Irregular shape | 25.0 | | | C | B | C |
| Example 7 | True sphere shape | 25.0 | | | A | B | B |
| Example 8 | True sphere shape | 25.0 | | | A | A | B |
| Example 9 | True sphere shape | 25.0 | | | B | A | B |
| Example 10 | True sphere shape | 2.0 | | | A | C | C |
| Example 11 | True sphere shape | 5.0 | | | A | C | B |
| Example 12 | True sphere shape | 10.0 | | | A | B | B |
| Example 13 | True sphere shape | 15.0 | | | A | B | B |
| Example 14 | True sphere shape | 35.0 | | | A | A | B |
| Example 15 | True sphere shape | 40.0 | | | A | B | C |
| Example 16 | True sphere shape | 45.0 | | | A | B | C |
| Example 17 | True sphere shape | 48.0 | | | A | C | C |
| Example 18 | True sphere shape | 15.0 | | | C | B | C |
| Example 19 | True sphere shape | 20.0 | | | B | A | B |
| Example 20 | True sphere shape | 30.0 | | | A | B | A |
| Example 21 | True sphere shape | 34.0 | | | AA | C | A |
| Example 22 | True sphere shape | 25.0 | | | A | A | B |
| Example 23 | True sphere shape | 25.0 | | | B | B | C |

TABLE 1-1-continued

| | | | | | | | |
|---|---|---|---|---|---|---|---|
| Example 24 | True sphere shape | 25.0 | | | A | B | C |
| Example 25 | True sphere shape | 25.0 | | | A | A | C |
| Example 26 | True sphere shape | 25.0 | | | A | A | C |
| Example 27 | True sphere shape | 25.0 | | | B | B | C |
| Example 28 | True sphere shape | 25.0 | | | A | A | B |

TABLE 1-2

| | Component (a) | | Component (b) | | Component (c)-1 | | | | Component (c)-2 | |
|---|---|---|---|---|---|---|---|---|---|---|
| | Type | Content [part by mass] | Type | Content [part by mass] | Type | Maximal value [nm] | Shape | Content [part by mass] | Type | Maximal value [nm] |
| Example 29 | a-1 | 39.4 | b-1 | 0.6 | c-1 | 30 | True sphere shape | 25.0 | c-5 | 10 |
| Example 30 | a-1 | 39.4 | b-1 | 0.6 | c-2 | 50 | True sphere shape | 25.0 | c-5 | 10 |
| Example 31 | a-1 | 39.4 | b-1 | 0.6 | c-3 | 80 | True sphere shape | 25.0 | c-5 | 10 |
| Example 32 | a-1 | 39.4 | b-1 | 0.6 | c-1 | 30 | True sphere shape | 25.0 | c-6 | 12 |
| Example 33 | a-1 | 39.4 | b-1 | 0.6 | c-2 | 50 | True sphere shape | 25.0 | c-6 | 12 |
| Example 34 | a-1 | 39.4 | b-1 | 0.6 | c-3 | 80 | True sphere shape | 25.0 | c-6 | 12 |
| Example 35 | a-1 | 39.4 | b-1 | 0.6 | c-1 | 30 | True sphere shape | 25.0 | c-7 | 15 |
| Example 36 | a-1 | 39.4 | b-1 | 0.6 | c-2 | 50 | True sphere shape | 25.0 | c-7 | 15 |
| Example 37 | a-1 | 39.4 | b-1 | 0.6 | c-3 | 80 | True sphere shape | 25.0 | c-7 | 15 |
| Example 38 | a-1 | 39.4 | b-1 | 0.6 | c-2 | 50 | True sphere shape | 48.0 | c-7 | 15 |
| Example 39 | a-1 | 39.4 | b-1 | 0.6 | c-2 | 50 | True sphere shape | 45.0 | c-7 | 15 |
| Example 40 | a-1 | 39.4 | b-1 | 0.6 | c-2 | 50 | True sphere shape | 40.0 | c-7 | 15 |
| Example 41 | a-1 | 39.4 | b-1 | 0.6 | c-2 | 50 | True sphere shape | 35.0 | c-7 | 15 |
| Example 42 | a-1 | 39.4 | b-1 | 0.6 | c-2 | 50 | True sphere shape | 15.0 | c-7 | 15 |
| Example 43 | a-1 | 39.4 | b-1 | 0.6 | c-2 | 50 | True sphere shape | 10.0 | c-7 | 15 |
| Example 44 | a-1 | 39.4 | b-1 | 0.6 | c-2 | 50 | True sphere shape | 5.0 | c-7 | 15 |
| Example 45 | a-1 | 39.4 | b-1 | 0.6 | c-2 | 50 | True sphere shape | 2.0 | c-7 | 15 |
| Example 46 | a-1 | 59.2 | b-1 | 0.8 | c-2 | 50 | True sphere shape | 15.0 | c-7 | 15 |
| Example 47 | a-1 | 49.3 | b-1 | 0.7 | c-2 | 50 | True sphere shape | 20.0 | c-7 | 15 |
| Example 48 | a-1 | 29.5 | b-1 | 0.5 | c-2 | 50 | True sphere shape | 30.0 | c-7 | 15 |
| Example 49 | a-1 | 21.6 | b-1 | 0.4 | c-2 | 50 | True sphere shape | 34.0 | c-7 | 15 |
| Example 50 | a-2 | 39.1 | b-1 | 0.9 | c-2 | 50 | True sphere shape | 25.0 | c-7 | 15 |
| Example 51 | a-3 | 39.6 | b-1 | 0.4 | c-2 | 50 | True sphere shape | 25.0 | c-7 | 15 |
| Example 52 | a-4 | 39.5 | b-1 | 0.5 | c-2 | 50 | True sphere shape | 25.0 | c-7 | 15 |
| Example 53 | a-5 | 39.4 | b-1 | 0.6 | c-2 | 50 | True sphere shape | 25.0 | c-7 | 15 |
| Example 54 | a-6 | 39.3 | b-1 | 0.7 | c-2 | 50 | True sphere shape | 25.0 | c-7 | 15 |
| Example 55 | a-7 | 38.4 | b-1 | 1.6 | c-2 | 50 | True sphere shape | 25.0 | c-7 | 15 |
| Example 56 | a-1 | 38.9 | b-1 | 1.1 | c-2 | 50 | True sphere shape | 25.0 | c-7 | 15 |
| Example 57 | a-1 | 39.4 | b-1 | 0.6 | c-2 | 50 | True sphere shape | 25.0 | c-7 | 15 |
| Example 58 | a-1 | 39.4 | b-1 | 0.6 | c-2 | 50 | True sphere shape | 25.0 | c-7 | 15 |
| Example 59 | a-1 | 39.4 | b-1 | 0.6 | c-2 | 50 | True sphere shape | 25.0 | c-7 | 15 |
| Example 60 | a-1 | 43.3 | b-1 | 0.7 | c-2 | 50 | True sphere shape | 25.0 | c-7 | 15 |
| Example 61 | a-1 | 32.6 | b-1 | 0.4 | c-2 | 50 | True sphere shape | 25.0 | c-7 | 15 |
| Example 62 | a-1 | 39.4 | b-1 | 0.6 | c-2 | 30 | True sphere shape | 25.0 | c-7 | 15 |

| | Component (c)-2 | | Component (d) | | | | |
|---|---|---|---|---|---|---|---|
| | Shape | Content [part by mass] | Type | Content [part by mass] | Tear strength | Bending durability | Chemical resistance |
| Example 29 | True sphere shape | 25.0 | d-1 | 10.0 | A | C | A |
| Example 30 | True sphere shape | 25.0 | d-1 | 10.0 | A | B | A |
| Example 31 | True sphere shape | 25.0 | d-1 | 10.0 | B | B | A |
| Example 32 | True sphere shape | 25.0 | d-1 | 10.0 | A | C | B |
| Example 33 | True sphere shape | 25.0 | d-1 | 10.0 | A | B | B |
| Example 34 | True sphere shape | 25.0 | d-1 | 10.0 | B | B | B |
| Example 35 | True sphere shape | 25.0 | d-1 | 10.0 | AA | B | A |
| Example 36 | True sphere shape | 25.0 | d-1 | 10.0 | AA | A | A |
| Example 37 | True sphere shape | 25.0 | d-1 | 10.0 | A | A | A |
| Example 38 | True sphere shape | 2.0 | d-1 | 10.0 | AA | C | B |
| Example 39 | True sphere shape | 5.0 | d-1 | 10.0 | AA | C | A |
| Example 40 | True sphere shape | 10.0 | d-1 | 10.0 | AA | B | A |
| Example 41 | True sphere shape | 15.0 | d-1 | 10.0 | AA | B | A |
| Example 42 | True sphere shape | 35.0 | d-1 | 10.0 | AA | A | A |
| Example 43 | True sphere shape | 40.0 | d-1 | 10.0 | AA | B | B |
| Example 44 | True sphere shape | 45.0 | d-1 | 10.0 | AA | B | B |
| Example 45 | True sphere shape | 48.0 | d-1 | 10.0 | AA | C | B |
| Example 46 | True sphere shape | 15.0 | d-1 | 10.0 | B | B | B |
| Example 47 | True sphere shape | 20.0 | d-1 | 10.0 | A | A | A |
| Example 48 | True sphere shape | 30.0 | d-1 | 10.0 | AA | B | A |
| Example 49 | True sphere shape | 34.0 | d-1 | 10.0 | AA | C | A |
| Example 50 | True sphere shape | 25.0 | d-1 | 10.0 | A | A | A |

TABLE 1-2-continued

| | | | | | | | |
|---|---|---|---|---|---|---|---|
| Example 51 | True sphere shape | 25.0 | d-1 | 10.0 | A | B | B |
| Example 52 | True sphere shape | 25.0 | d-1 | 10.0 | AA | B | B |
| Example 53 | True sphere shape | 25.0 | d-1 | 10.0 | AA | A | B |
| Example 54 | True sphere shape | 25.0 | d-1 | 10.0 | AA | A | B |
| Example 55 | True sphere shape | 25.0 | d-1 | 10.0 | A | B | B |
| Example 56 | True sphere shape | 25.0 | d-1 | 10.0 | AA | A | A |
| Example 57 | True sphere shape | 25.0 | d-1 | 10.0 | A | A | A |
| Example 58 | True sphere shape | 25.0 | d-1 | 10.0 | AA | A | A |
| Example 59 | True sphere shape | 25.0 | d-1 | 10.0 | AA | A | A |
| Example 60 | True sphere shape | 25.0 | d-1 | 6.0 | AA | A | A |
| Example 61 | True sphere shape | 25.0 | d-1 | 17.0 | AA | B | A |
| Example 62 | True sphere shape | 25.0 | d-1 | 10.0 | A | C | C |

TABLE 1-3

| | Component (a) | | Component (b) | | Component (c)-1 | | | | Component (c)-2 | |
|---|---|---|---|---|---|---|---|---|---|---|
| | Type | Content [part by mass] | Type | Content [part by mass] | Type | Maximal value [nm] | Shape | Content [part by mass] | Type | Maximal value [nm] |
| Comparative Example 1 | a-1 | 39.4 | b-1 | 0.6 | c-2 | 50 | True sphere shape | 50.0 | | — |
| Comparative Example 2 | a-1 | 39.4 | b-1 | 0.6 | | | — | | c-7 | 15 |
| Comparative Example 3 | a-1 | 88.9 | b-1 | 1.1 | | | — | | | |
| Comparative Example 4 | a-1 | 98.8 | b-1 | 1.2 | | | — | | | |
| Comparative Example 5 | a-1 | 39.4 | b-1 | 0.6 | t-2 | 110 | True sphere shape | 25.0 | c-7 | 15 |
| Comparative Example 6 | a-1 | 39.4 | b-1 | 0.6 | c-2 | 50 | True sphere shape | 25.0 | t-3 | 5 |
| Comparative Example 7 | a-1 | 39.4 | b-1 | 0.6 | c-2 | 50 | True sphere shape | 25.0 | c-1 | 30 |

| | Component (c)-2 | | Component (d) | | | | |
|---|---|---|---|---|---|---|---|
| | Shape | Content [part by mass] | Type | Content [part by mass] | Tear strength | Bending durability | Chemical resistance |
| Comparative Example 1 | — | | d-1 | 10.0 | A | D | D |
| Comparative Example 2 | True sphere shape | 50.0 | d-1 | 10.0 | A | C | E |
| Comparative Example 3 | — | | d-1 | 10.0 | D | D | E |
| Comparative Example 4 | | — | | | D | D | E |
| Comparative Example 5 | True sphere shape | 25.0 | d-1 | 10.0 | D | D | D |
| Comparative Example 6 | True sphere shape | 25.0 | d-1 | 10.0 | A | D | C |
| Comparative Example 7 | True sphere shape | 25.0 | d-1 | 10.0 | A | C | D |

<Notes of table>

"Maximal value": meaning a particle diameter of the peak top of the maximal peak

[Component (a)]

a-1: vinyl-terminated diphenylsiloxane-dimethylsiloxane copolymer (manufactured by Gelest, Inc., trade name "PDV-0541", weight-average molecular weight: 60,000, amount of diphenylsiloxane: 5 mol %)

a-2: vinyl-terminated diphenylsiloxane-dimethylsiloxane copolymer (manufactured by Gelest, Inc., trade name "PDV-0535", weight-average molecular weight: 47,500, amount of diphenylsiloxane: 5 mol %)

a-3: vinyl-terminated polydimethylsiloxane (manufactured by Gelest, Inc., trade name "DMS-V52", weight-average molecular weight: 155,000)

a-4: vinyl-terminated polydimethylsiloxane (manufactured by Gelest, Inc., trade name "DMS-V46", weight-average molecular weight: 117,000)

a-5: vinyl-terminated polydimethylsiloxane (manufactured by Gelest, Inc., trade name "DMS-V42", weight-average molecular weight: 72,000)

a-6: vinyl-terminated polydimethylsiloxane (manufactured by Gelest, Inc., trade name "DMS-V41", weight-average molecular weight: 62,700)

a-7: vinyl-terminated polydimethylsiloxane (manufactured by Gelest, Inc., trade name "DMS-V31"weight-average molecular weight: 28,000)

[Component (b)]

b-1: polymethylhydroxysiloxane (manufactured by Gelest, Inc., trade name "HMS-991", weight-average molecular weight: 1,600, methylhydroxysiloxy unit: 100 mol %, Si—H equivalent: 67 g/mol)

b-2: methylhydrosiloxane-phenylmethylsiloxane copolymer (manufactured by Gelest, Inc., trade name "HPM-502", weight-average molecular weight: 4,500, methylhydroxysiloxy unit: 47 mol %, Si—H equivalent: 165 g/mol)

[Component (c)-1]

c-1: manufactured by Shin-Etsu Chemical Co., Ltd., trade name "QSG-30", average particle diameter: 30 nm, surface-treated product of methyltrimethoxysilane (hereinafter, abbreviated as MTMS) and hexamethyldisilazane (hereinafter, abbreviated as HMDS), true sphere shape, methanol hydrophobicity degree: 67% c-2: "YA050C-SP3" manufactured by Admatechs; average particle diameter: 50 nm, surface-treated product of phenyltrimethoxysilane, true sphere shape, methanol hydrophobicity degree: 47% c-3: manufactured by Shin-Etsu Chemical Co., Ltd., trade name "QSG-80", average particle diameter: 80 nm, surface-treated product of MTMS and HMDS, true sphere shape, methanol hydrophobicity degree: 67% c-4: manufactured by TAYCA Co., Ltd., trade name "MSP-011", average particle diameter: 30 nm, surface-treated product of MTMS and HMDS, irregular shape, methanol hydrophobicity degree: 41%

[Component (c)-2]

c-5: "YA010C" manufactured by Admatechs; average primary particle diameter: 10 nm, surface-treated product of phenyltrimethoxysilane, true sphere shape, methanol hydrophobicity degree: 50% c-6: manufactured by Evonik Industries AG, trade name "AEROSIL R974", average primary particle diameter: 12 nm, surface-treated product of dimethyldichlorosilane, irregular shape, methanol hydrophobicity degree: 33% c-7: manufactured by Shin-Etsu Chemical Co., Ltd., trade name "QSG-10", average primary particle diameter: 15 nm, surface-treated product of MTMS and HMDS, true sphere shape, methanol hydrophobicity degree: 72%

[Component (d)]

d-1: polysiloxane resin represented by the following average compositional formula (M/Q=0.87, see JP2014-80546A)

$$(SiO_{4/2})_{1.0}((CH_2{=}CH)(CH_3)_2SiO_{1/2})_{0.12}((CH_3)_3SiO_{1/2})_{0.75}$$

a kinematic viscosity of a 50% by mass xylene solution of the polysiloxane resin (C-1) was 3.0 $mm^2/s$.

d-2: polysiloxane resin represented by the following average compositional formula (M/Q=1.75, see JP2014-80546A)

$$(SiO_{4/2})_{1.0}((CH_2{=}CH)(CH_3)_2SiO_{1/2})_{0.25}((CH_3)_3SiO_{1/2})_{1.5}$$

a kinematic viscosity of a 50% by mass xylene solution of the polysiloxane resin (C-2) was 1.5 $mm^2/s$.

d-3: polysiloxane resin represented by the following average compositional formula (M/Q=1.06, see JP1994-331079A (JP-H7-331079A))

$$(SiO_{4/2})_{1.0}((CH_2{=}CH)(CH_3)_2SiO_{1/2})_{0.12}((CH_3)_3SiO_{1/2})_{0.94}$$

a kinematic viscosity of a 50% by mass xylene solution of the polysiloxane resin (C-3) was 3.5 $mm^2/s$.

d-4: polysiloxane resin represented by the following average compositional formula (M/Q=0.62)

$$(SiO_{4/2})_{1.0}((CH_3)SiO_{3/2})_{0.25}((CH_2{=}CH)(CH_3)_2SiO_{1/2})_{0.12}((CH_3)_3SiO_{1/2})_{0.50}$$

a kinematic viscosity of a 50% by mass xylene solution of the polysiloxane resin (C-4) was 3.3 $mm^2/s$.

[Other Silicas (t)]

t-2: manufactured by Shin-Etsu Chemical Co., Ltd., trade name "QSG-100", average primary particle diameter: 110 nm, surface-treated product of MTMS and HMDS, true sphere shape, methanol hydrophobicity degree: 67% t-3: manufactured by Evonik Industries AG, trade name "AEROSIL RX380S", average primary particle diameter: 5 nm, surface-treated product of HMDS, irregular shape, methanol hydrophobicity degree: 29%

From Table 1, the following was found.

In the silicone resin sheet of Comparative Example 1, which was produced using surface-treated silica particles not satisfying the definition of the present invention, the bending durability and the chemical resistance were not sufficient.

In the silicone resin sheet of Comparative Example 2, which was produced using surface-treated silica particles not satisfying the definition of the present invention, the chemical resistance was not sufficient.

In the silicone resin sheets of Comparative Examples 3 and 4, which were produced without using the silica particles, the tear strength, the bending durability, and the chemical resistance were not sufficient.

In the silicone resin sheet of Comparative Example 5, which was produced using surface-treated silica particles not satisfying the definition of the present invention, the tear strength, the bending durability, and the chemical resistance were not sufficient.

In the silicone resin sheet of Comparative Example 6, which was produced using surface-treated silica particles not satisfying the definition of the present invention, the bending durability was not sufficient.

In the silicone resin sheet of Comparative Example 7, which was produced using surface-treated silica particles not satisfying the definition of the present invention, the chemical resistance was not sufficient.

On the other hand, in the silicone resin sheets (Examples 1 to 62) produced using the composition according to the embodiment of the present invention, it was found that the silicone resin sheets had excellent tear strength, bending durability, and chemical resistance.

The present invention has been described with the embodiments thereof, any details of the description of the present invention are not limited unless described otherwise, and it is obvious that the present invention is widely construed without departing from the gist and scope of the present invention described in the accompanying claims.

EXPLANATION OF REFERENCES

1: acoustic lens
2: acoustic matching layer
3: piezoelectric element layer
4: backing material
7: housing
9: cord
10: ultrasound probe

What is claimed is:

1. A composition for an acoustic lens, comprising the following components (a) to (c):

(a) a linear polysiloxane having a vinyl group;

(b) a linear polysiloxane having two or more Si—H groups in a molecular chain; and (c) surface-treated silica particles, wherein, in a particle diameter distribution of the component (c) obtained by a scanning transmission electron microscope, one or more maximal peaks are detected in a range in which a peak top is 16 nm or more and less than 100 nm, and one or more maximal peaks are detected in a range in which a peak top is 8 nm or more and less than 16 nm.

2. The composition for an acoustic lens according to claim 1, wherein a shape of the component (c) is a true sphere shape.

3. The composition for an acoustic lens according to claim 1, wherein a content of the component (c) is 25 to 70 parts by mass in 100 parts by mass of a total content of the components (a) to (c).

4. The composition for an acoustic lens according to claim 1, wherein a content of the component (a) is 25 to 70 parts by mass and a content of the component (b) is 0.3 to 3 parts by mass, in 100 parts by mass of a total content of the components (a) to (c).

5. The composition for an acoustic lens according to claim 1, further comprising:

(d) a polysiloxane resin.

6. The composition for an acoustic lens according to claim 5, wherein a content of the component (d) is 5 to 20 parts by mass in 100 parts by mass of a total content of the components (a) to (d).

7. The composition for an acoustic lens according to claim 5, wherein a content of the component (c) is 25 to 70 parts by mass in 100 parts by mass of a total content of the components (a) to (d).

8. The composition for an acoustic lens according to claim 5, wherein a content of the component (a) is 20 to 65 parts by mass and a content of the component (b) is 0.3 to 3 parts by mass, in 100 parts by mass of a total content of the components (a) to (d).

9. The composition for an acoustic lens according to claim 1, wherein the surface treatment of the component (c) is a surface treatment with a silane compound.

10. The composition for an acoustic lens according to claim 1, wherein the surface treatment of the component (c) is a surface treatment with an aromatic silane compound.

11. The composition for an acoustic lens according to claim 1, wherein a methanol hydrophobicity degree of the component (c) is 40% to 80% by mass.

12. The composition for an acoustic lens according to claim 1, wherein the component (a) has a phenyl group.

13. The composition for an acoustic lens according to claim 1, wherein a weight-average molecular weight of the component (a) is 20,000 to 200,000.

14. The composition for an acoustic lens according to claim 1, wherein a weight-average molecular weight of the component (a) is 40,000 to 150,000.

15. The composition for an acoustic lens according to claim 5, wherein the component (d) is a polysiloxane resin which includes an $R_3SiO_{1/2}$ unit and an $SiO_{4/2}$ unit and has at least two vinyl groups in one molecule, and a molar ratio of the $R_3SiO_{1/2}$ unit to the $SiO_{4/2}$ unit is 0.6 to 1.2, provided that R represents a monovalent hydrocarbon group.

16. The composition for an acoustic lens according to claim 15, wherein the component (d) consists of the $R_3SiO_{1/2}$ unit and the $SiO_{4/2}$ unit.

17. The composition for an acoustic lens according to claim 1, further comprising:

at least one of platinum or a platinum compound in an amount of 0.00001 to 0.01 parts by mass with respect to 100 parts by mass of a total content of the components (a) to (c).

18. The composition for an acoustic lens according to claim 5, further comprising:

at least one of platinum or a platinum compound in an amount of 0.00001 to 0.01 parts by mass with respect to 100 parts by mass of a total content of the components (a) to (d).

19. An acoustic lens obtained by curing the composition for an acoustic lens according to claim 1.

20. An acoustic wave probe comprising:

the acoustic lens according to claim 19.

21. An ultrasound probe comprising:

the acoustic lens according to claim 19.

22. An acoustic wave measurement apparatus comprising:

the acoustic wave probe according to claim 20.

23. An ultrasound diagnostic apparatus comprising:

the acoustic wave probe according to claim 20.

24. A photoacoustic wave measurement apparatus comprising:

the acoustic lens according to claim 19.

25. An ultrasonic endoscope comprising:

the acoustic lens according to claim 19.

26. A method for manufacturing an acoustic wave probe, comprising:

forming an acoustic lens using the composition for an acoustic lens according to claim 1.

27. The composition for an acoustic lens according to claim 1, wherein, in the particle diameter distribution of the component (c) obtained by the scanning transmission electron microscope, there are one maximal peak at which the peak top is detected in the range of 16 nm or more and less than 100 nm, and one maximal peak at which the peak top is detected in the range of 8 nm or more and less than 16 nm.

28. The composition for an acoustic lens according to claim 1, wherein, in the particle diameter distribution of the component (c), a ratio of an area ($A^s$) of the maximal peak in a range in which the peak top is 16 nm or more and less than 100 nm to an area ($A^b$) of the maximal peak in a range in which the peak top is 8 nm or more and less than 16 nm, as $A^s$:$A^b$, is 24:1 to 1:24.

29. The composition for an acoustic lens according to claim 1, wherein the component (c) includes at least one surface-treated silica particles having an average primary particle diameter calculated by the scanning transmission electron microscope of 16 nm or more and less than 100 nm and at least one surface-treated silica particles having an average primary particle diameter calculated by the scanning transmission electron microscope of 8 nm or more and less than 16 nm.

* * * * *